(12) United States Patent
Shinozaki

(10) Patent No.: US 7,055,906 B2
(45) Date of Patent: Jun. 6, 2006

(54) RECLINER MEANS AND VEHICLE SEAT PROVIDED WITH THE RECLINER MEANS

(75) Inventor: Katsuhiko Shinozaki, Tochigi (JP)

(73) Assignee: TS Tech Co., Ltd. (JP)

( * ) Notice: Subject to any disclaimer, the term of this patent is extended or adjusted under 35 U.S.C. 154(b) by 281 days.

(21) Appl. No.: 10/723,184

(22) Filed: Nov. 26, 2003

(65) Prior Publication Data
US 2005/0035640 A1    Feb. 17, 2005

(30) Foreign Application Priority Data
Nov. 27, 2002   (JP) .............................. 2002-343646

(51) Int. Cl.
*B60N 2/235* (2006.01)
(52) U.S. Cl. .................................................... 297/367
(58) Field of Classification Search ................ 297/367, 297/366
See application file for complete search history.

(56) References Cited

U.S. PATENT DOCUMENTS

| | | | | |
|---|---|---|---|---|
| 6,007,153 A | * | 12/1999 | Benoit et al. ........... | 297/378.12 |
| 6,082,821 A | * | 7/2000 | Baloche et al. ......... | 297/354.12 |
| 6,626,495 B1 | * | 9/2003 | Okazaki et al. ........ | 297/367 |
| 6,722,738 B1 | * | 4/2004 | Uramichi ................. | 297/367 |
| 6,758,525 B1 | * | 7/2004 | Uramichi ................. | 297/366 |

* cited by examiner

*Primary Examiner*—Peter R. Brown
*Assistant Examiner*—Tania Abraham
(74) *Attorney, Agent, or Firm*—Dann, Dorfman, Herrell and Skillman, P.C.

(57) ABSTRACT

A recliner mechanism includes a housing, a cover having first gear teeth, latches movably arranged in the housing, the latches having inducting pins and second gear teeth, a cam disc having guide holes, the guide holes having first and second hole end portions, the inducting pins being inserted through the guide holes, an actuating shaft, the cam and the cam disc being integrally mounted on the actuating shaft, the cover being combined with the housing in a face-to-face relation with the housing so as to be rotatable relative to the housing, springs arranged in the housing for urging the cam so as to cause the second gear teeth of the latches to be engaged with the first gear teeth of the cover, a memory disc having controlling holes formed therein and spaced apart protruding pieces protruding therefrom, the controlling holes having first and second hole portions and middle hole portions, the inducting pins being inserted in the middle hole portions, and an applying plate mounted on the actuating shaft, the applying shaft having feeding pawls that are adapted to selectively abutted against the protruding pieces. A vehicle seat provided with the recliner means is also disclosed.

2 Claims, 25 Drawing Sheets

US 7,055,906 B2

RECLINER MEANS AND VEHICLE SEAT PROVIDED WITH THE RECLINER MEANS

BACKGROUND OF THE INVENTION

1. Field of the Invention

This invention relates to recliner means for allowing a seat back of a vehicle seat to be pivoted or inclined relative to a seat cushion of the vehicle seat by manually operating an operating lever for the recliner means, and a vehicle seat provided with the recliner means in which changing of a posture of the seat back from a forwardly inclined posture to a predetermined standing posture, or returning of the seat back to a predetermined point can be carried out without operating the operating lever and continuing holding of the operating lever.

2. Description of the Prior Art

Referring now to FIGS. 1 to 8, a conventional recliner device will be discussed hereinafter in order to facilitate understanding of the present invention.

Referring to FIG. 1, the conventional recliner device comprises a disc-like housing 10, a disc-like cover 11 rotatably fitted in the housing 10 in a face-to-face relation with the housing 10, a pair of latches 12, 12' arranged within the housing 10 and movable between locked positions and unlocked positions or in a radial direction of the cover 11 fitted in the housing 10, a cam 13 arranged within the housing 10 for causing the latches 12, 12' to be displaced toward the locked positions, two spiral springs 14, 14' arranged within the housing 10, a cam disc 15 integrated with the cam 13, and an actuating shaft 16 penetrating the housing 10 and the cover 11. The cam 13 and the cam disc 15 are integrally fixed on an axis of the actuating shaft 16.

Referring to FIG. 2, the disc-like housing 10 comprises a circular plate-like body 10a' and an annular wall portion 10a rising up from a peripheral edge of the circular plate-like body 10a'. An inner surface of the circular plate-like body 10a' is provided with two pairs of guide blocks 10b, 10c, 10b', 10c' for supporting the latches 12, 12' from both sides of the latches 12, 12' so as to allow the latches 12, 12' to be slid on the inner surface of the circular plate-like body 10a', and support pins 10d, 10d' to which innermost ends of the spiral springs 14, 14' are to be fastened when the recliner device is assembled. The circular plate-like body 10a' is formed with a bearing hole 10e at a central portion of the circular plate-like body 10a', through which the actuating shaft 16 is to be inserted when the recliner device is assembled. Furthermore, the circular plate-like body 10a' is provided with a plurality of hollow projections 10f that extend through the full thickness of the plate-like body 10a' from the inner surface of the plate-like body 10a' and project from an outer surface of the plate-like body 10a'. The projections 10f are to be welded to a bracket plate of a seat cushion frame when the recliner device is mounted to the vehicle seat.

Referring to FIG. 3, the disc-like cover 11 comprises a circular plate-like body 11a' and an annular wall portion 11a rising up from a peripheral edge of the circular plate-like body 11a'. The cover 11 is to be fitted in the housing 10 in a face-to-face relation with the housing 10 when the recliner device is assembled. An outer diameter of the annular wall portion 11a of the cover 11 is smaller than an inner diameter of the annular wall portion 10a of the housing 10, so that the cover 11 is rotatable relative to the housing 10. Gear teeth 11b are formed around an inner periphery of the annular wall portion 11a of the cover 11. The circular plate-like body 11a' of the cover 11 has a bearing hole 11c which is formed in a central portion of the circular plate-like body 11a' and through which the actuating shaft 16 is to be inserted when the recliner device is assembled. Furthermore, the circular plate-like body 11a of the cover 11 has a plurality of hollow projections 11d that extend through the full thickness of the plate-like body 11a' from an inner surface of the plate-like body 11a' and project from an outer surface of the plate-like body 11a'. The hollow projections 11d are to be welded to a side plate of a seat back frame when the recliner device is mounted to the vehicle seat.

Referring to FIG. 4, each of the latches 12, 12' is in the form of a substantially quadrilateral plate. The latches 12, 12' are to be arranged within the housing 10 and are to be supported from the both sides thereof by the guide blocks 10b, 10c, 10b', 10c' of the housing 10 so as to be slid on the inner surface of the circular plate-like body 10a' of the housing 10. The latches 12, 12' have gear teeth 12a, 12a' formed at regions of peripheries thereof. The gear teeth 12a, 12a' of the latches 12, 12' are adapted to be releasably meshed with the gear teeth 11b of the cover 11 at the locked positions. The latches 12, 12' further have steped receiver jaw portions 12b, 12b' provided at regions of the peripheries thereof which are opposite the regions of the peripheries of the latches 12, 12' at which the gear teeth 12a, 12a' are formed. The receiver jaw portions 12b, 12b' of the latches are adapted to receive the cam 13. Furthermore, the latches 12, 12' are provided with inducting pins 12c, 12c' that stand up from general surfaces of the latches 12, 12' and are to be inserted through substantially ellipse-shaped guide holes of the cam disc 15 which will be discussed in greater detail hereinafter.

Referring to FIG. 5, the cam 13 is in the form of a plate and includes pusher edges 13a, 13a' for pushing the latches 12, 12' toward the locked positions, receiving edges 13b, 13b' adapted to be abutted against the latches 12, 12' at the unlocked positions, and stopper edges 13c, 13c' with which outermost ends of the spiral springs 14, 14' are to be engaged. The pusher edges, the receiving edges, and the stopper edges are continuously connected to one another through curved regions. The cam 13 is formed with a stopper hole 13d of a quadrilateral shape in which a bearing piece 16a of a quadrilateral shape having a through-hole (see FIG. 1) is to be fitted. The actuating shaft 16 is to be fitted through the bearing piece 16a mounted in the stopper hole 13d of the cam 13. The cam 13 is further provided with two spaced apart projections 13e, 13e' which stand up from a general surface of the cam 13 and between which the stopper hole 13d is interposed. The projections 13e, 13e' of the cam 13 serve as means to integrally mount the cam 13 to the cam disc 15.

Referring to FIG. 6, the cam disc 15 is in the form of a circular plate and formed with the substantially ellipse-shaped guide holes 15a, 15a' which are spaced apart from each other through a center of the cam disc 15. Each of the guide holes 15a, 15a' is formed in the cam disc 15 so as to obliquely extend from a region of the cam disc 15, which is adjacent the periphery of the cam disc 15, to a region of the cam disc 15 which is remote from the periphery of the cam disc 15. The guide holes 15a, 15a' have first hole ends 150, 150' which are located at regions of the cam disc 15 which are adjacent the periphery of the cam disc 15, and second hole ends 151, 151' which are located at regions of the cam disc 15 which are adjacent the center of the cam disc 15. The first hole ends 150, 150' positionally correspond to the locked positions. The second hole ends 151, 151' positionally corresponds to the unlocked positions. As briefly discussed above, the inducting pins 12c, 12c' of the latches 12, 12' are inserted through the guide holes 15a, 15a' of the cam disc 15. When the inducting pins 12c, 12c' of the latches 12, 12' are located at the first hole ends 150, 150' of the guide holes 15a, 15a', the gear teeth 12a, 12a' of the latches 12, 12' are meshed with the gear teeth 11b of the cover 11. When the inducting pins 12c, 12c' of the latches 12, 12' are located at the second hole ends 151, 151' of the guide holes 15a, 15a', the gear teeth 12a, 12a' of the latches 12, 12' are disengaged from the gear teeth 11b of the cover 11. Furthermore, the cam disc 15 is formed with a first stopper hole 15b of a quadrilateral shape in which the bearing piece 16a is to be fitted, and second stopper holes 15c, 15c' in which the projections 13e, 13e' of the cam 13 are to be fitted.

Referring to FIG. 7, the actuating shaft 16 comprises a receiving portion 16b in which an operating lever (not shown) for actuating the recliner device is to be mounted, a collar portion 16c which is to be applied onto the outer surface of the circular plate-like body of the housing 10, a first axial portion 16d which is to be inserted through the bearing hole 10e of the housing, a second axial portion 16e which is to be fitted through the through-hole of the bearing piece 16a fitted in the holes 13d, 15b of the cam 13 and cam disc 15 and which is to be inserted in the bearing hole 11c of the cover 11, and a third axial portion 16f which is to be projected outwardly from the cover 11 and is to be connected to one end of a supporting shaft (not shown). The bearing piece 16a is formed independently from the actuating shaft 16.

The cam 13 is to be integrally fixed to the cam disc 15 by causing the projections 13e, 13e' of the cam 13 to be fitted into the second stopper holes 15c, 15c' of the cam disc 15. The bearing piece 16a is to be fitted in the stopper holes 13d, 15b of the cam 13 and cam disc 15. An assembly comprising the bearing 16a, the cam 13, and the cam disc 15 is to be integrally fixed on the actuating shaft 16, so that when the actuating shaft 16 is rotated by the operating shaft, the assembly is rotated.

Referring to FIG. 8, assembling of the recliner device will be discussed hereinafter. The third axial portion 16f (see FIG. 7) of the actuating shaft 16 is inserted through the bearing hole 10e of the housing 10 from the outer side of the housing 10, the first axial portion 16d (see FIG. 7) of the actuating shaft 16 is inserted through the bearing hole 10e of the housing 10, and the collar portion 16c (see FIG. 7) of the actuating shaft 16 is applied onto the outer surface of the circular plate-like body of the housing 10, whereby housing 10 is mounted on the actuating shaft 16. The latches 12, 12' are arranged within the housing 10 and supported from the both sides of the latches 12, 12' by the guide blocks 10b, 10c, 10b', 10c' so as to be radially slid on the plate-like body 10a' of the housing 10 between the locked positions and the unlocked positions.

The assembly comprising the cam 13, the cam disc 15, and the bearing piece 16a is mounted on the second axial portion 16e of the actuating shaft 16 through the through-hole of the bearing piece 16a, with the cam 13 being arranged between the latches 12, 12'. The inducting pins 12c, 12c' of the latches 12, 12' are inserted through the first hole end portions 150, 150' of the guide holes 15a, 15a' of the cam disc 15 which correspond to the locked positions of the latches 12, 12'. The spiral springs 14, 14' are arranged within the housing 10, retained between the cam 13 and the support pins 10d, 10d' of the housing 10, and always bias the cam 13 so as to cause the cam 13 to displace the latches 12, 12' towards the locked positions.

The cover 11 is rotatably mounted on the actuating shaft 16 through the bearing hole 11c (see FIG. 3), and combined with the housing 10 with the wall portion 11a thereof being received in the wall portion 10a of the housing 10 so as to be rotatable relative to the housing 10. In the assembled condition of the recliner device, the gear teeth 12a, 12a' of the latches 12, 12' are meshed with the gear teeth 11b of the cover 11 by the cam 13 that is always urged by the spiral springs 14, 14', whereby the cover 11 is prevented from being rotated relative to the housing 10.

Referring to FIG. 9, two recliner devices 1, 1 that are constructed as described above are provided at pivotal points between side plates 2a of the seat back frame 2 and bracket plates 3a of the seat cushion frame. The recliner devices 1, 1 are coupled to each other through the supporting shaft which is connected at both ends thereof to the actuating shafts of the recliner devices 1, 1, whereby the recliner devices 1, 1 are adapted to be synchronously actuated. The operating lever 5 is provided at the actuating shaft of one of the recliner devices 1, 1.

Referring to 10, spiral tension springs 6 (only one tension spring 6 is shown in FIG. 10) are provided between the side plates 2a of the seat back frame 2 (only one side plate 2a is shown in FIG. 10) and the bracket plates 3a of the seat cushion frame (only one bracket plate 3a is shown in FIG. 10). A coil spring 7 is stretched between the operating lever 5 and the bracket plate 3a. When the operating lever 7 is rotated or pulled upwardly, the recliner devices 1, 1 are adapted to be brought to unlocked conditions. In the unlocked conditions, an angle of a seat back relative to a seat cushion can be adjusted and the seat back can be pivoted or inclined forward and rearward.

Referring to FIG. 11, the operation of each of the recliner devices will be described in detail hereinafter. When a person rotates the operating lever 5 in a direction while holding the operating lever 5 by hand, the assembly comprising the cam 13, the bearing piece 16a, and cam disc 15 which are integrally fixed on the actuating shaft 16 is rotated. At this time, the guide holes 15a, 15a' of the cam disc 15 are moved relative to the inducting pins 12c, 12c' of the latches 12, 12'. As the guide holes 15a, 15a' of the cam disc 15 are moved relative to the inducting pins 12c, 12c', the inducting pins 12c, 12c' arrive at the second hole ends 151, 151' of the guide holes 15a, 15a' of the cam disc 15 which correspond to the unlocked positions of the latches 12, 12', whereby the latches 12, 12' are displaced so as to be disengaged from the gear teeth 11b of the cover 11. As a result, the cover 11 is brought to an unlocked condition where the cover 11 becomes rotatable relative to the housing 10.

As long as the person still holds the operating lever 5, the unlocked condition is maintained and the seat back is allowed to be inclined forward and rearward relative to the seat cushion. If the operating lever 5 is released from the person's hand, the latches 12, 12' are urged toward the locked positions by the cam 13 due to actions of the spiral springs 14, 14', whereby the gear teeth 12a, 12a' of the latches 12, 12' are operatively meshed with the gear teeth 11b of the cover 11. As a result, the cover 11 is brought to a locked condition where the cover 11 is prevented from being rotated relative to the housing 10.

In the conventional recliner device, as long as the operating lever is still held by the person in the unlocked condition of the cover, the seat back is allowed to be inclined or folded forward and rearward relative to the seat cushion. In other words, in order that the person can cause the seat back to be inclined relative to the seat cushion in the unlocked condition, the person must continue holding the operating lever. In addition, bringing of the seat back to a normal standing posture relative to the seat cushion is forced to be performed with resort to visual judgement by the person. Furthermore, the tension springs are stretched between the side plates of the seat back frame and the bracket plates of the seat cushion frame as discussed above, so that as soon as the gear teeth of the latches are disengaged from the gear teeth of the cover, the seat back is collapsed excessively forward due to the actions of the tension springs. Therefore, any additional stopper is required for restricting the excessively forward collapsing of the seat back (Japanese Patent Application Laid-Open No. 2002-10850).

SUMMARY OF THE INVENTION

The present invention has been made with a view to overcoming the foregoing problems of the prior art recliner device.

It is therefore an object of the present invention to provide recliner means for allowing a seat back of a vehicle seat to be collapsed forward and rearward relative to a seat cushion of the vehicle seat by operating an operating lever for the recliner means and allowing a posture of the seat back to be changed from a forwardly folded posture to a predetermined standing posture, or allowing the seat back to be returned to a predetermined point, without continuing holding the operating lever, and a vehicle seat provided with the recliner means.

In accordance with one aspect of the present invention, there is provided recliner means for allowing a seat back of a vehicle seat to be pivoted or inclined relative to a seat cushion of the vehicle seat. The recliner means comprises a disc-like housing having a first bearing hole, a disc-like cover having a plate portion, a second bearing hole formed in a central portion of the plate portion, a peripheral wall provided around the plate portion, first gear teeth around an inner surface of the peripheral wall, and spaced apart feeding pawls rising up from the plate portion, latches having second gear teeth and inducting pins projecting therefrom, the latches being arranged within the housing so as to be movable between locked positions and unlocked positions, an actuating shaft, a cam having an outer shape suitable for releasably pushing the latches, a cam disc having guide holes formed therein, the guide holes including first hole end portions that are adjacent a periphery of the cam disc, and second hole end portions that are adjacent a center of the cam disc, the first hole end portions positionally corresponding to the locked positions, the second hole end portions positionally corresponding to the unlocked positions, the cam and the cam disc being integrally mounted on an axial portion of the actuating shaft, the housing mounted on the axial portion of the actuating shaft through the first bearing hole so as to cause the latches to be engaged with the cam, the inducting pins of the latches being inserted through the first hole end portions of the guide holes of the cam disc, springs for biasing the cam, the springs being provided between the cam and the housing to urge the cam so as to urge the latches toward the locked positions through the cam, the cover being mounted on the axial portion of the actuating shaft through the second bearing hole in a face-to-face relation with the housing so as to be rotatable relative to the housing, the housing and the cover being adapted to be locked relative to each other by engagement of the first gear teeth of the latches with the second gear teeth of the cover at the locked positions, a memory disc mounted on the axial portion of the actuating shaft so as to face the cam disc, and the memory disc being formed with controlling holes extending longer than the guide holes of the cam disc, the controlling holes including first hole portions extending beyond the first hole end portions of the guide holes, second hole portions extending beyond the second hole end portions of the guide holes, and middle hole portions, the first hole portions of the controlling holes positionally corresponding to the locked positions, the second hole portions of the controlling holes positionally corresponding to the unlocked positions, the inducting pins of the latches being inserted in the middle hole portions of the controlling holes from the first hole end portions of the guide holes, the memory disc having spaced apart protruding pieces protruding radially from a periphery thereof, the feeding pawls of the cover being interposed between the protruding pieces of the memory disc so as to be capable of being selectively abutted against the protruding pieces of the memory disc, and the memory disc being adapted to be rotated in one direction or the other direction by abutting of the feeding pawls against the protruding pieces in synchronization with the rotation of the cover relative to the housing, wherein when the actuating shaft is rotated in a direction, the cam disc integrally mounted on the axial portion of the actuating shaft is rotated so as to cause the latches to be displaced toward the unlocked positions from the locked positions while receiving the inducting pins of the latches at the second hole end portions of the guide holes, to thereby bring to a condition where the cover is rotatable relative to the housing, and when the actuating shaft is released, the latches are urged toward the locked positions by the cam due to actions of the springs, whereby the second gear teeth of the latches are meshed with the first gear teeth of the cover and the cover is locked with respect to the housing.

In accordance with a further aspect of the present invention, there is provided a vehicle seat which is provided with recliner means for allowing a seat back of the vehicle seat to be pivoted or inclined relative to a seat cushion of the vehicle seat. The recliner means comprises a disc-like housing having a first bearing hole, a disc-like cover having a plate portion, a second bearing hole formed in a central portion of the plate portion, a peripheral wall provided around the plate portion, first gear teeth around an inner surface of the peripheral wall, and spaced apart feeding pawls rising up from the plate portion, latches having second gear teeth and inducting pins projecting therefrom, the latches being arranged within the housing so as to be movable between locked positions and unlocked positions, an actuating shaft, a cam having an outer shape suitable for releasably pushing the latches, a cam disc having guide holes formed therein, the guide holes including first hole end portions that are adjacent a periphery of the cam disc, and second hole end portions that are adjacent a center of the cam disc, the first hole end portions positionally corresponding to the locked positions, the second hole end portions positionally corresponding to the unlocked positions, the cam and the cam disc being integrally mounted on an axial portion of the actuating shaft, the housing mounted on the axial portion of the actuating shaft through the first bearing hole so as to cause the latches to be engaged with the cam, the inducting pins of the latches being inserted through the first hole end portions of the guide holes of the cam disc, springs for biasing the cam, the springs being provided between the cam and the housing to urge the cam so as to urge the latches toward the locked positions through the cam, the cover being mounted on the axial portion of the actuating shaft through the second bearing hole in a face-to-face relation with the housing so as to be rotatable relative to the housing, the housing and the cover being adapted to be locked relative to each other by engagement of the first gear teeth of the latches with the second gear teeth of the cover at the locked positions, a memory disc mounted on the axial portion of the actuating shaft so as to face the cam disc, and the memory disc being formed with controlling holes extending longer than the guide holes of the cam disc, the controlling holes including first hole portions extending beyond the first hole end portions of the guide holes, second hole portions extending beyond the second hole end portions of the guide holes, and middle hole portions, the first hole portions of the controlling holes positionally corresponding to the locked positions, the second hole portions of the controlling holes positionally corresponding to the unlocked positions, the inducting pins of the latches being inserted in the middle hole portions of the controlling holes from the first hole end portions of the guide holes, the memory disc having spaced apart protruding pieces protruding radially from a periphery thereof, the feeding pawls of the cover being interposed between the protruding pieces of the memory disc so as to be capable of being selectively abutted against the protruding pieces of the memory disc, and the memory disc being adapted to be rotated in one direction or the other direction by abutting of the feeding pawls against the protruding pieces in synchronization with the rotation of the cover relative to the housing, wherein when the actuating shaft is rotated in a direction, the cam disc integrally mounted on the axial portion of the actuating shaft is rotated so as to cause the latches to be displaced toward the unlocked positions from the locked positions while receiving the inducting pins of the latches at the second hole end portions of the guide holes, to thereby bring to a condition where the cover is rotatable relative to the housing, and when the actuating shaft is released, the latches are urged toward the locked positions by the cam due to actions of the springs, whereby the second gear teeth of the latches are meshed with the first gear teeth of the cover and the cover is locked with respect to the housing.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, in which like reference numerals denote the same parts throughout the Figures and wherein.

DETAILED DESCRIPTION OF THE PREFERRED EMBODIMENT

Figure 1:
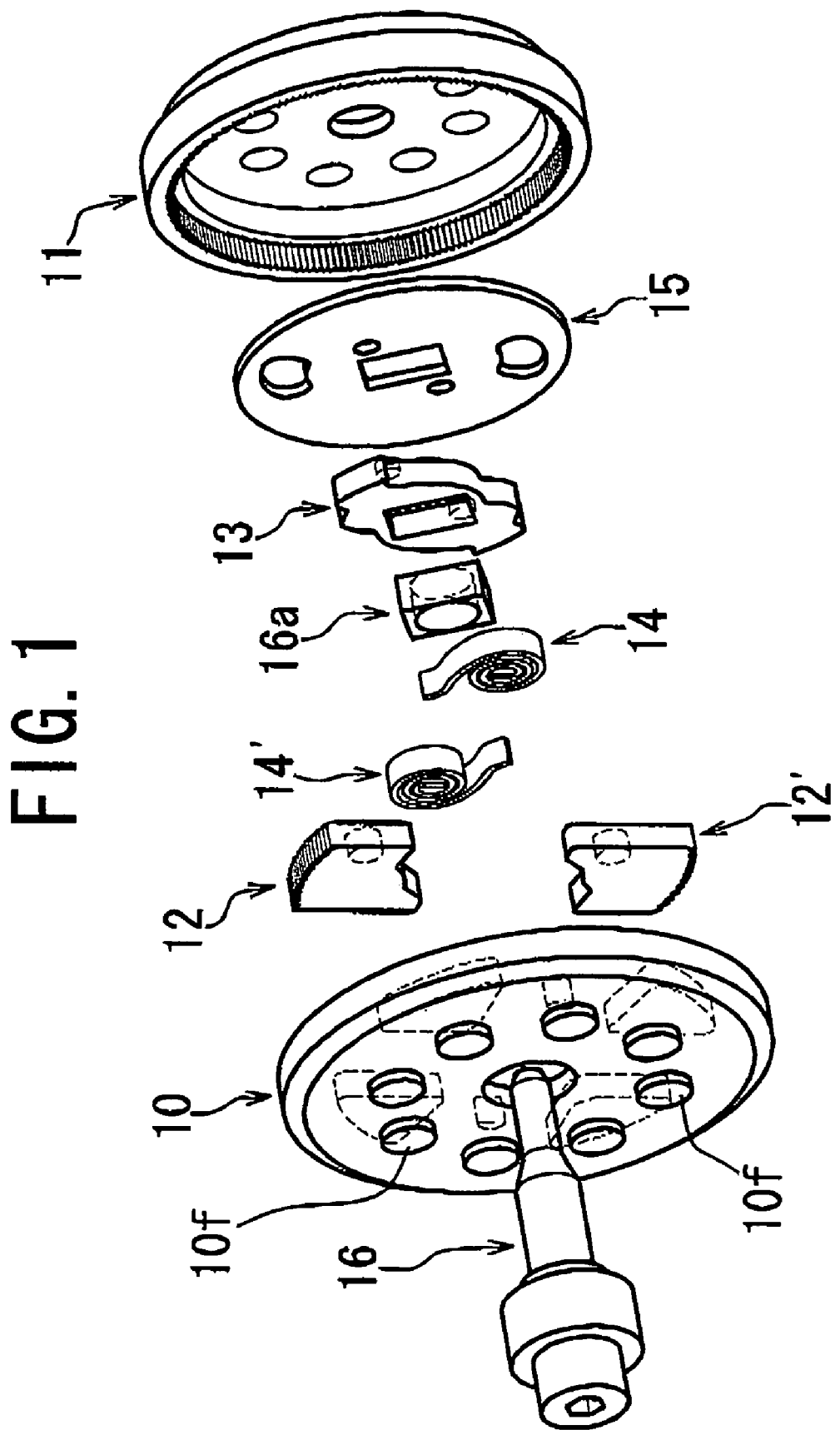
FIG. 1 is a schematic exploded perspective view of a conventional recliner device.
Figure 2:
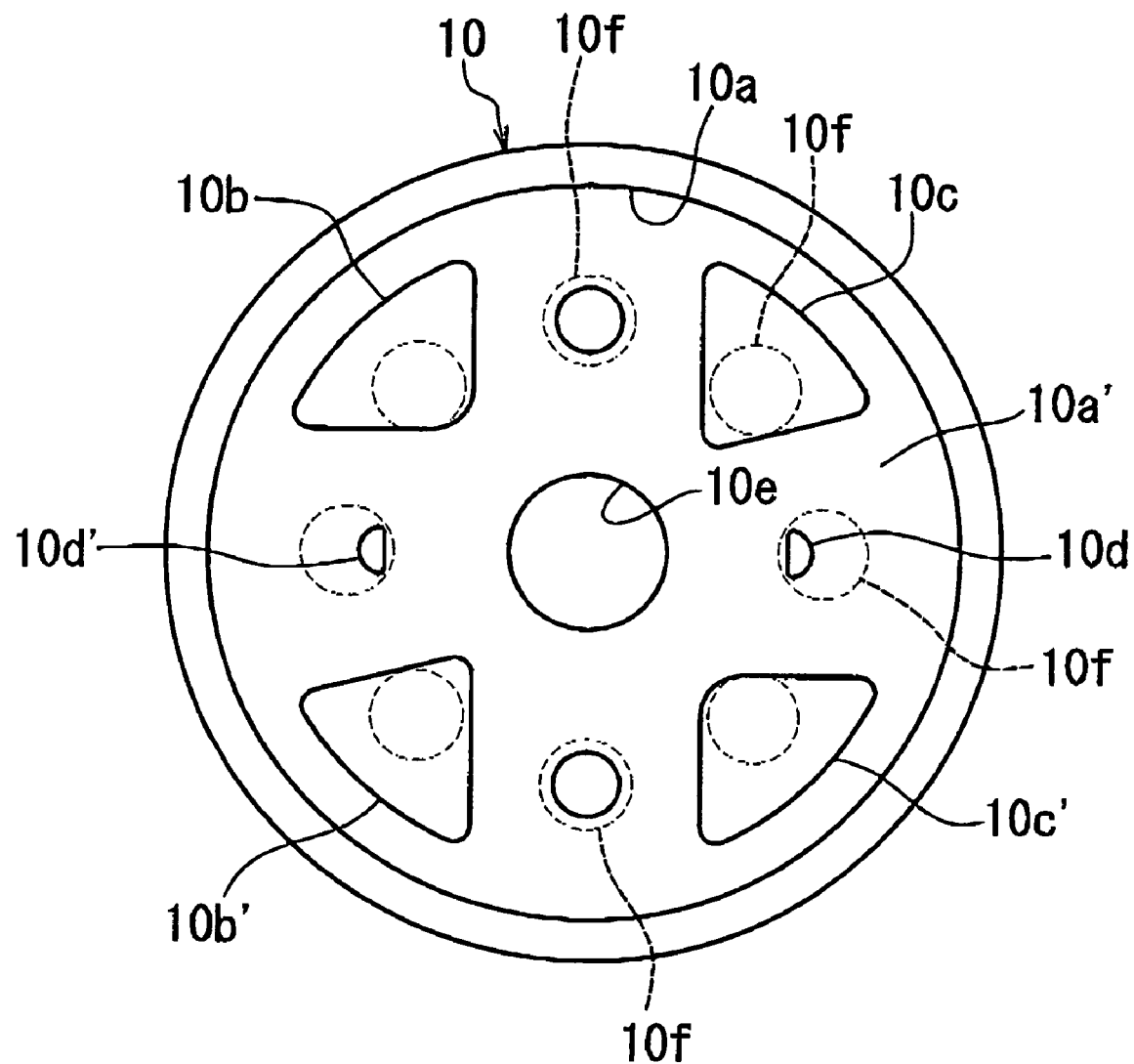
FIG. 2 is a schematic side view of a housing being one of components making up the conventional recliner device of FIG. 1.
Figure 3:
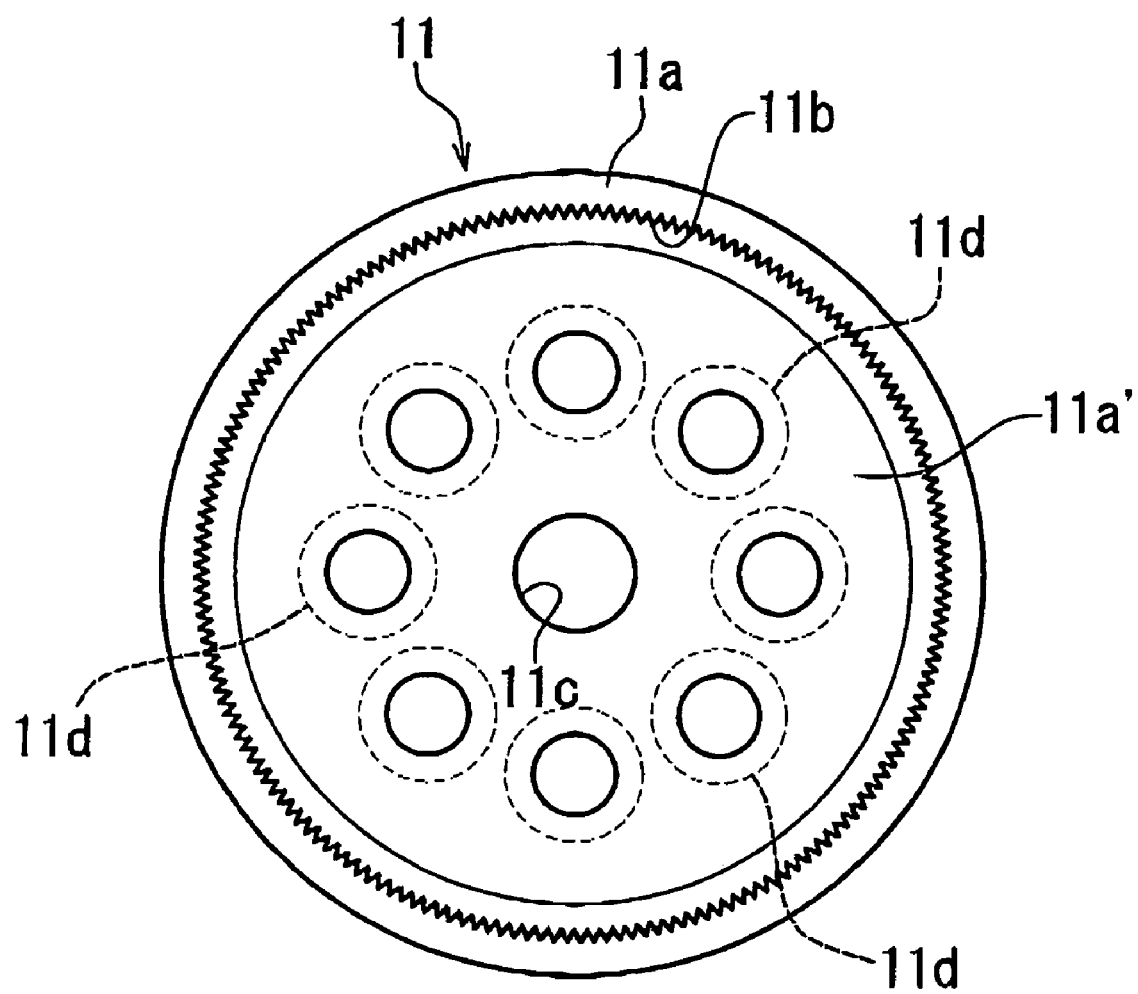
FIG. 3 is a schematic side view of a cover being one of the components of the recliner device of FIG. 1.
Figure 4:
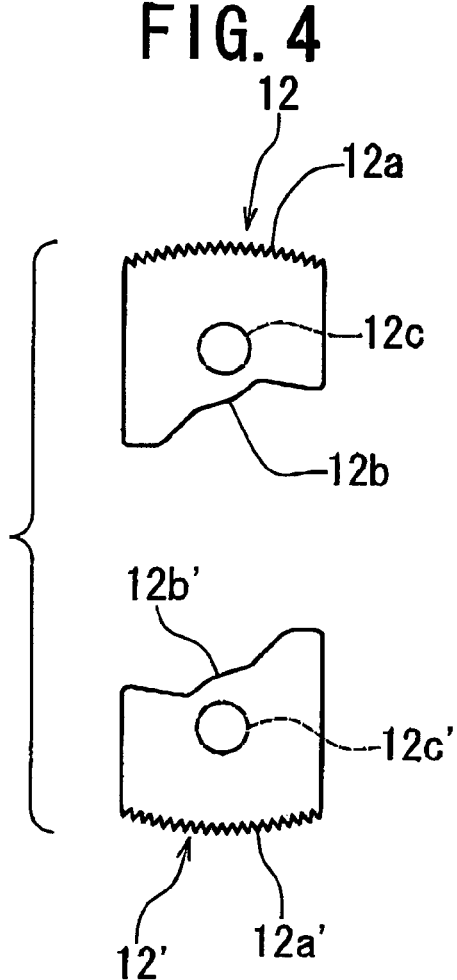
FIG. 4 is a schematic side view of latches being ones of the components of the recliner device of FIG. 1.
Figure 5:
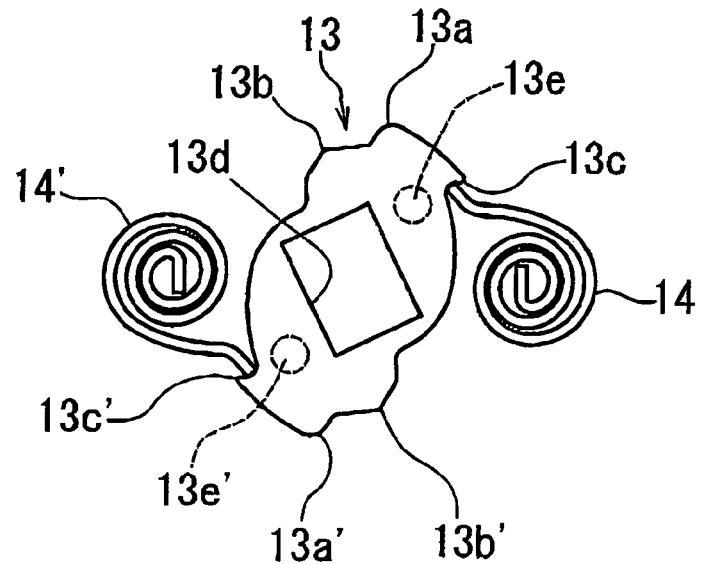
FIG. 5 is a schematic side view of a cam being one of the components of the recliner device, and spiral springs being ones of the components of the recliner device.
Figure 6:
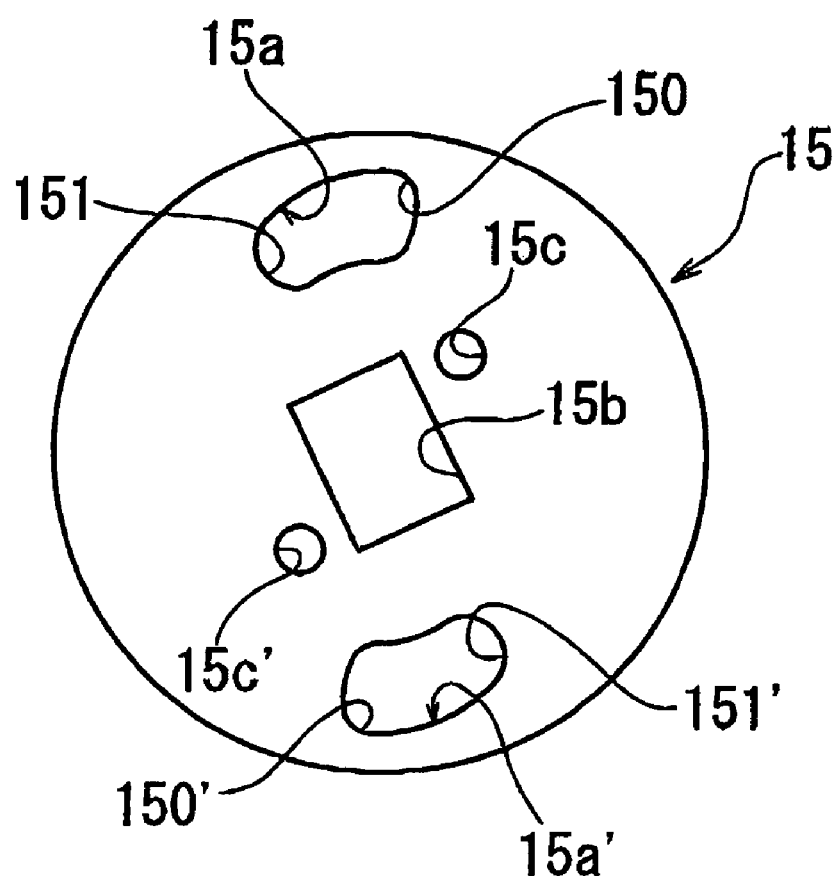
FIG. 6 is a schematic side view of a cam disc being one of the components of the recliner device.
Figure 7:
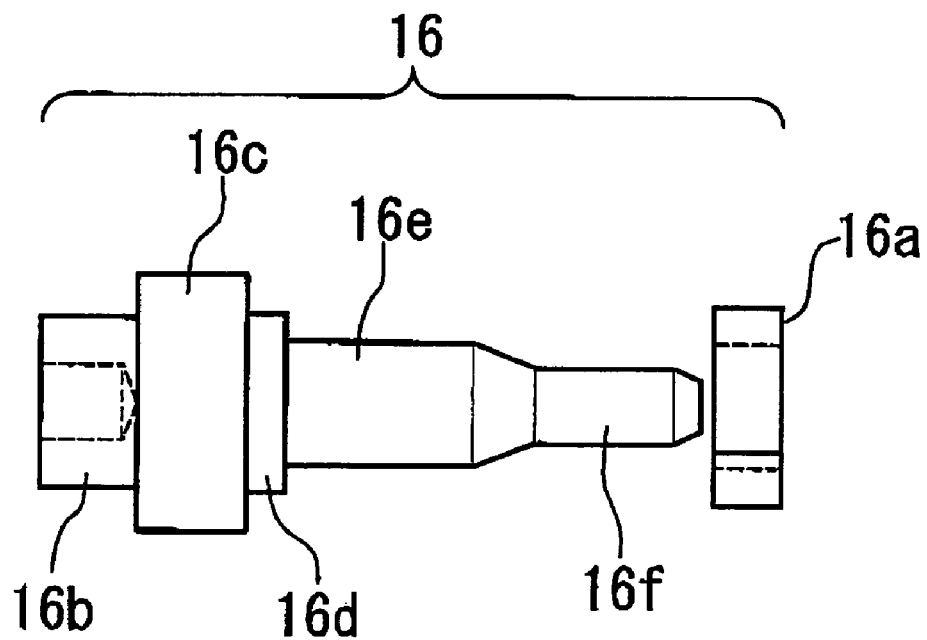
FIG. 7 is a schematic side view of an actuating shaft being one of the components of the recliner device.
Figure 8:
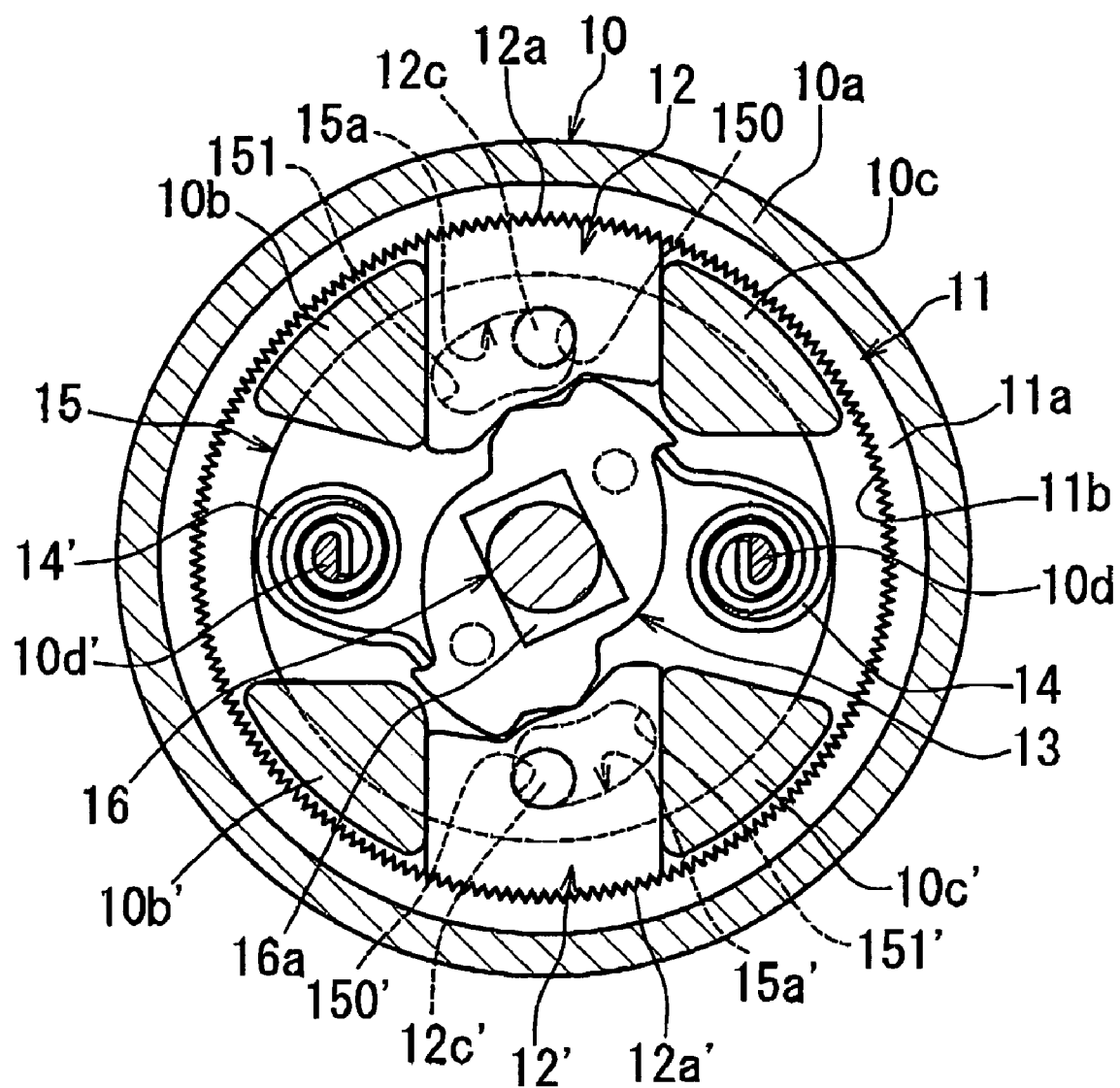
FIG. 8 is a schematic sectional side view of the recliner device in an assembled condition.

Referring to FIGS. 12 to 28, there is illustrated a recliner device according to an embodiment of the present invention. The embodiment of the present invention is substantially similar to the conventional recliner device of FIGS. 1 to 8 except that a memory disc 17 and an applying plate 18 are employed. In FIGS. 12 to 28, components that are substantially similar to those of the conventional recliner device of FIGS. 1–8 are denoted by the same reference numerals. The description of them will not be repeated hereinafter.

Figure 13:
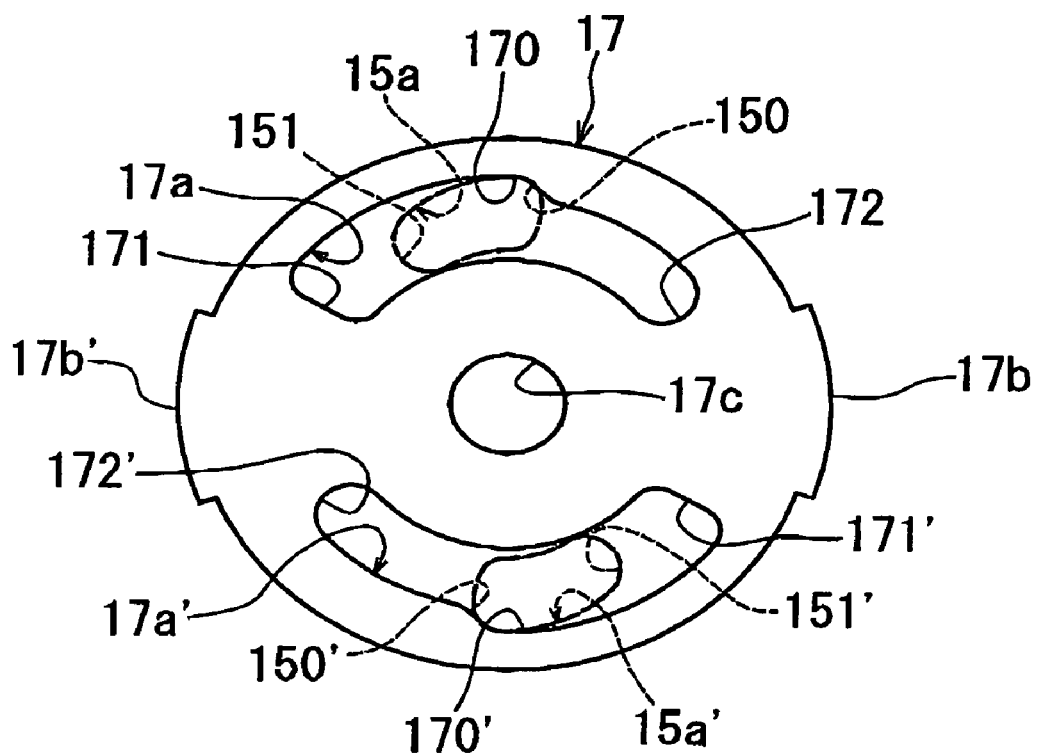
FIG. 13 is a schematic side view of a memory disc being one of components of the recliner device of FIG. 12.

Referring to FIG. 13, the memory disc 17 is a circular plate form. The memory disc 17 is formed with controlling holes 17a, 17a' which are spaced apart from each other and opposite each other through a center of the memory disc 17. The memory disc 17 has radially protruding pieces 17b, 17b' which are provided at regions of a periphery of the memory disc 17 and opposite each other. Furthermore, the memory disc 17 has a through-hole 17c formed in the center thereof, through which the second axial portion 16e of the actuating shaft 16 is to be inserted.

In the illustrated example, a position at which a seat back of a vehicle seat is kept in a normal standing posture relative to a seat cushion of the vehicle seat is previously set as a predetermined point. The controlling holes 17a, 17a' of the memory disc 17 are concentric with the through-hole 17c and formed in the memory disc 17 so as to extend longer than the guide holes 15a, 15a' of the cam disc 15. The controlling holes 17a, 17a' have first hole portions 171, 171' which are adjacent a periphery of the memory disc 17, second hole portions 172, 172' which are offset from the first hole portions 171, 171' and adjacent the center of the memory disc 17, and middle hole portions 170, 170' which are aligned with the first hole end portions 150, 150' of the guide holes 15a, 15a' of the cam disc 15 at the predetermined point at which the seat back is kept in the normal standing posture relative to the seat cushion.

The second hole portions 171, 171' of the controlling holes 17a, 17a' extend in one rotational direction of the memory disc 17 beyond the first hole end portions 151, 151' of the cam disc 15 so that the seat back is allowed to be brought to a rearward inclined or collapsed condition. The first hole portions 172, 172' of the controlling holes 17a, 17a' extend in the other rotational direction of the memory disc 17 beyond the second hole end portions 150, 150' of the cam disc 15 so that the seat back is allowed to be brought to a forward inclined or collapsed condition.

Figure 14:
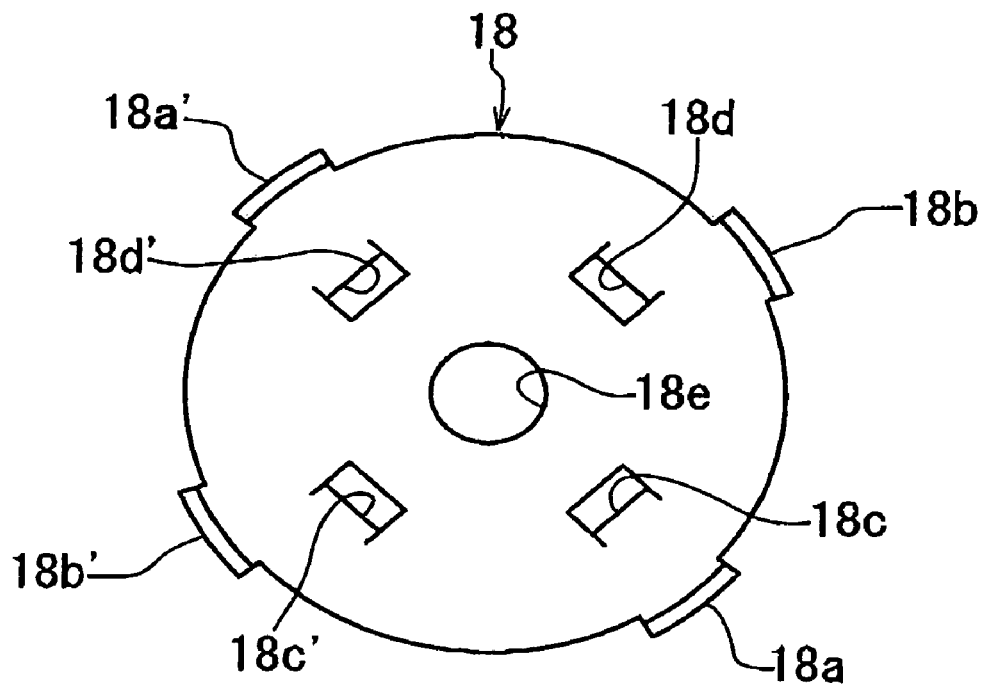
FIG. 14 is a schematic side view of an applying plate being one of the components of the recliner device of FIG. 12.

Referring to FIG. 14, the applying plate 18 is in the form of a circular plate. The applying plate 18 has two pairs of spaced apart feeding pawls 18a, 18b, 18a', 18b' provided at regions of a periphery thereof. Each of the feeding pawls 18a, 18b, 18a', 18b' is projected radially from the applying plate 18 and rises up in a direction. When the recliner device is assembled, the memory disc 17 is to be combined with the applying plate 18, with the protruding piece 17b thereof being interposed between one pair of the feeding pawls 18a, 18b and with the protruding piece 17b' thereof being interposed between the other pair of the feeding pawls 18a', 18b'. The applying plate 18 is provided with rising pawls 18c, 18d, 18c', 18d' for integrally mounting the applying plate 18 to the cover 11 therethrough. The rising pawls 18c, 18d, 18c', 18d' of the applying plate 18 are formed by cutting portions of the applying plate 18 and causing the portions of the applying plate 18 to rise up in the opposite direction to the rising-up direction of the feeding pawls 18a, 18b, 18a', 18b'. In addition, the applying plate 18 is formed with a through-hole 18e at a center of the applying plate 18, through which the second axial portion 16e of the actuating shaft 16 are to be inserted.

Figure 15:
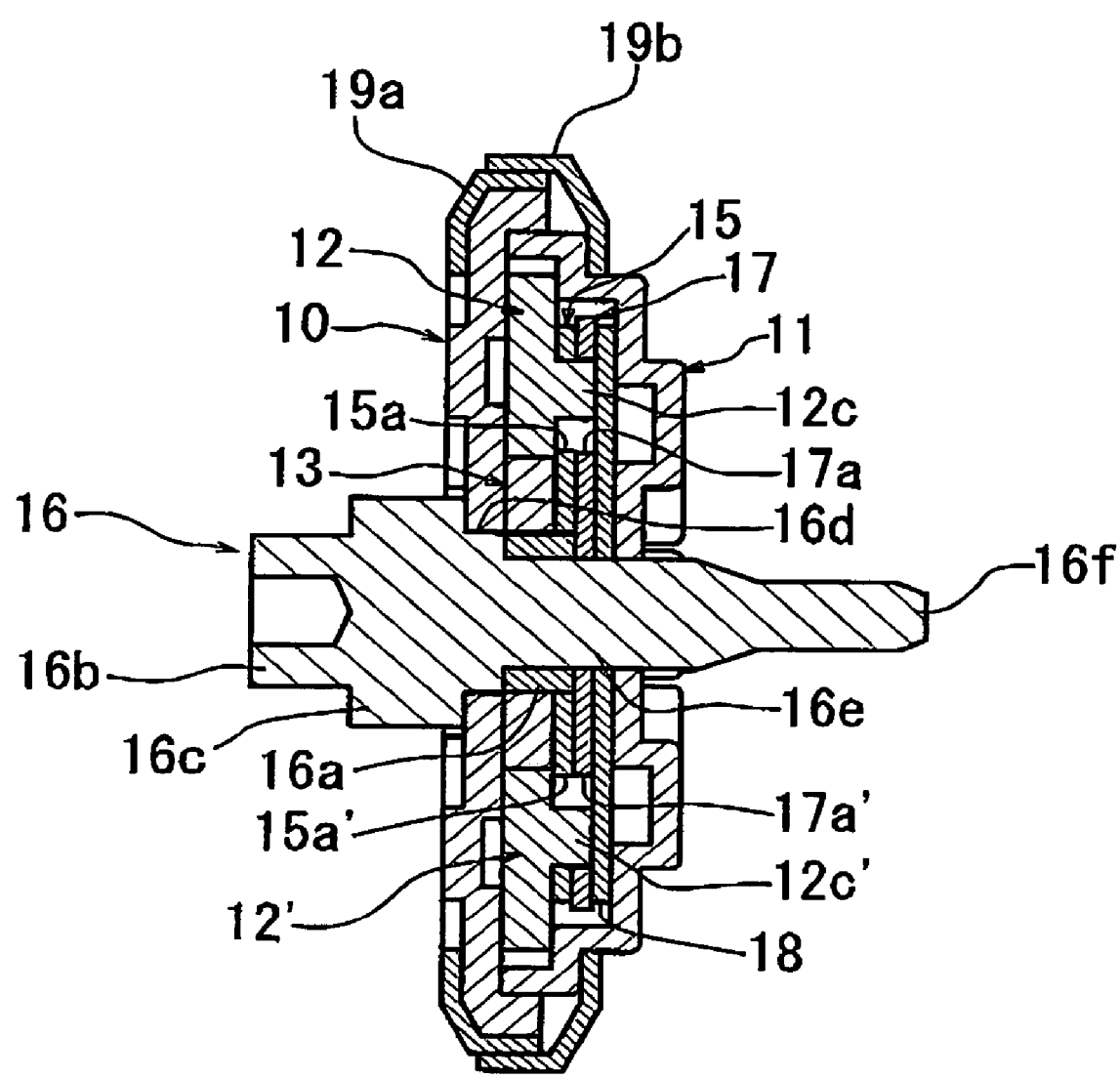
FIG. 15 is a schematic cross-sectional view of the recliner device of FIG. 12 in an assembled condition.
Figure 16:
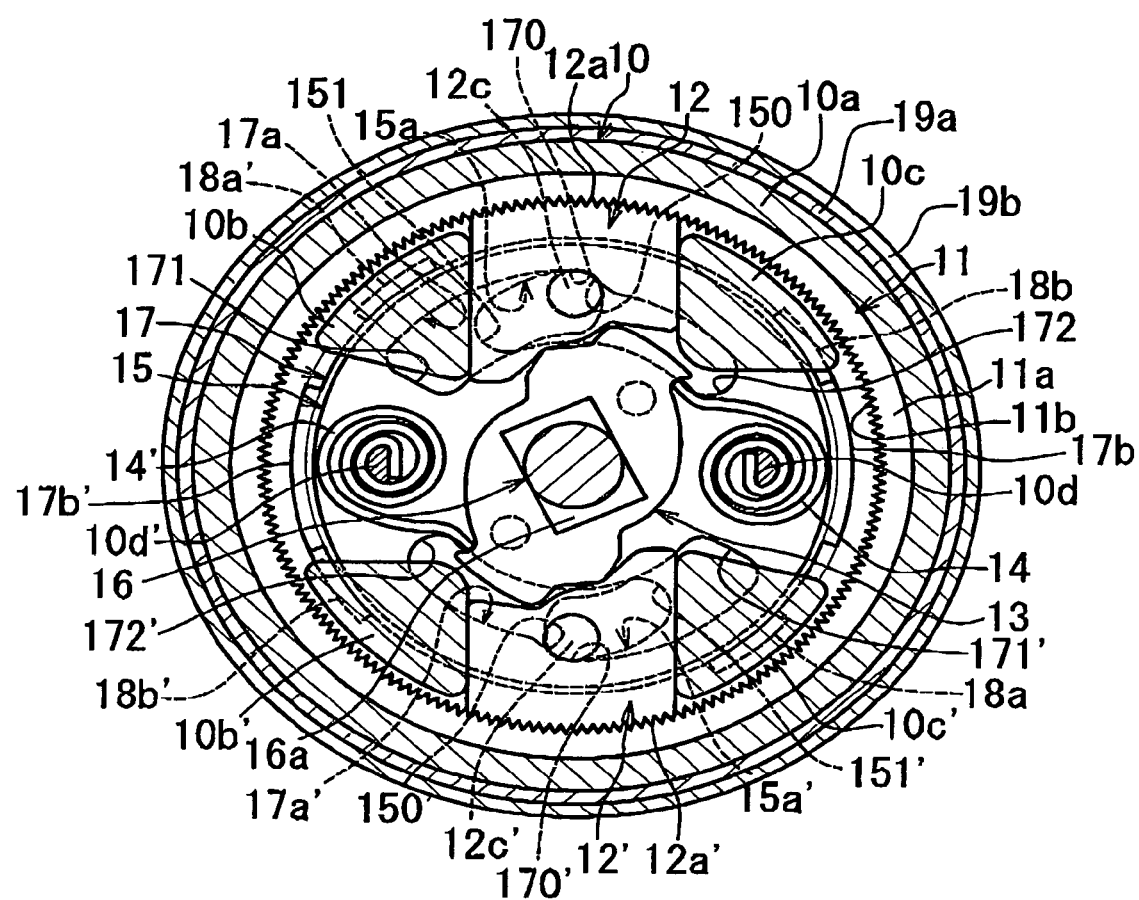
FIG. 16 is a schematic sectional side view of the recliner device of FIG. 12 in the assembled condition.

Referring to FIGS. 15 and 16, the second axial portion 16e of the actuating shaft 16 is inserted through the through-hole 17c (FIG. 13) of the memory disc 17, and the memory disc 17 is arranged in a face-to-face relation with the cam disc 15. The inducting pins 12c, 12c' of the latches 12, 12' which are inserted through the first hole portions 150, 150' of the guide holes 15a, 15a' of the cam disc 15 are further inserted in the middle hole portions 170, 170' of the controlling holes 17a, 17a'.

The applying plate 18 is arranged within the cover 11 and integrally fixed to the cover 11 by causing the rising pawls 18a, 18b, 18a', 18b' to be engaged with openings (not shown) of any of the hollow projections 11d of the cover 11. The second axial portion 16e of the actuating shaft 16 is inserted through the through-hole 18e of the applying plate 18 and the bearing hole 11c of the cover 11. The feeding pawls 18a, 18b or 18a', 18b' of the applying plate 18 are adapted to be selectively abutted against the protruding piece 17b or 17b' of the memory disc 17. When the cover 11 and the applying plate 18 integrally fixed to the cover 11 are rotated relative to the housing 10 and the feeding pawls 18a, 18b or 18a', 18b' of the applying plate 18 are abutted against the protruding piece 17b or 17b' of the memory disc 17, the memory disc 17 is rotated around the actuating shaft 16 in a normal rotational direction (in a counterclockwise direction in FIG. 16) or in a reverse rotational direction (in a clockwise direction in FIG. 16).

The cover 11 is rotatably combined with the housing 10 in a face-to-face relation with the housing 10 by ring members 19a, 19b which are mounted on the cover 11 and the housing 10, respectively, and fitted together. Incidentally, if the feeding pawls 18a, 18b, 18a', 18b' are provided at the cover 11 so as to rise up from the inner surface of the cover 11, the applying plate can be omitted.

Figure 9:
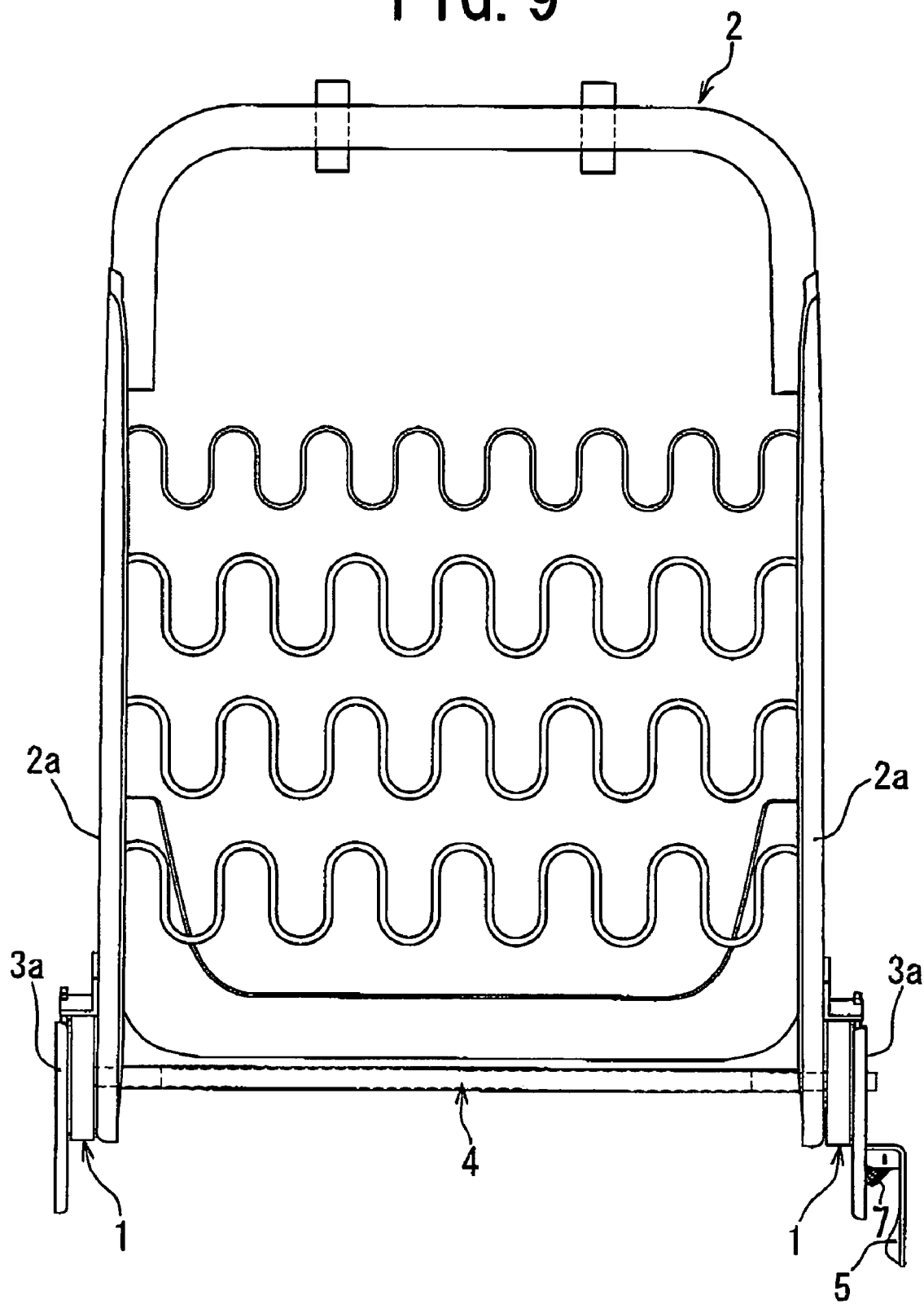
FIG. 9 is a schematic front view of a vehicle seat which may be provided at both sides thereof with the conventional recliner devices or recliner devices according to the present invention.
Figure 10:
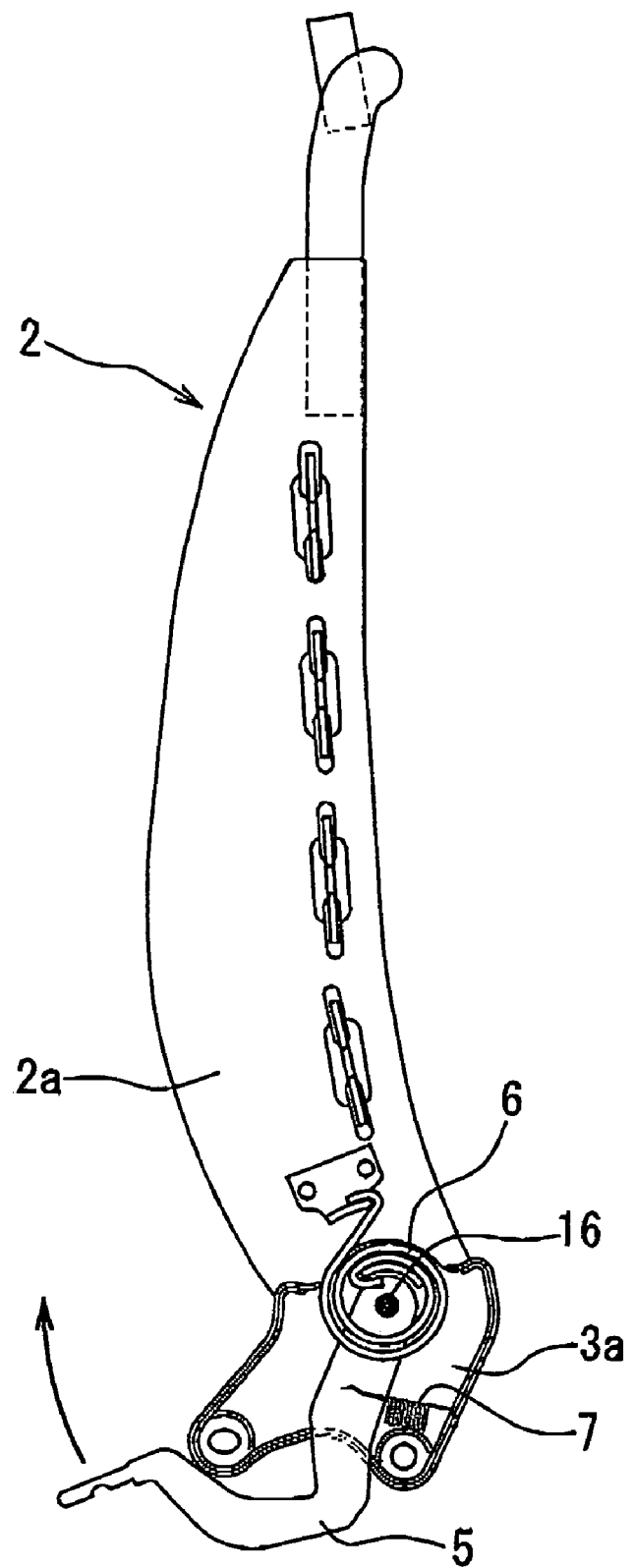
FIG. 10 is a schematic side view of the vehicle seat.
Figure 11:
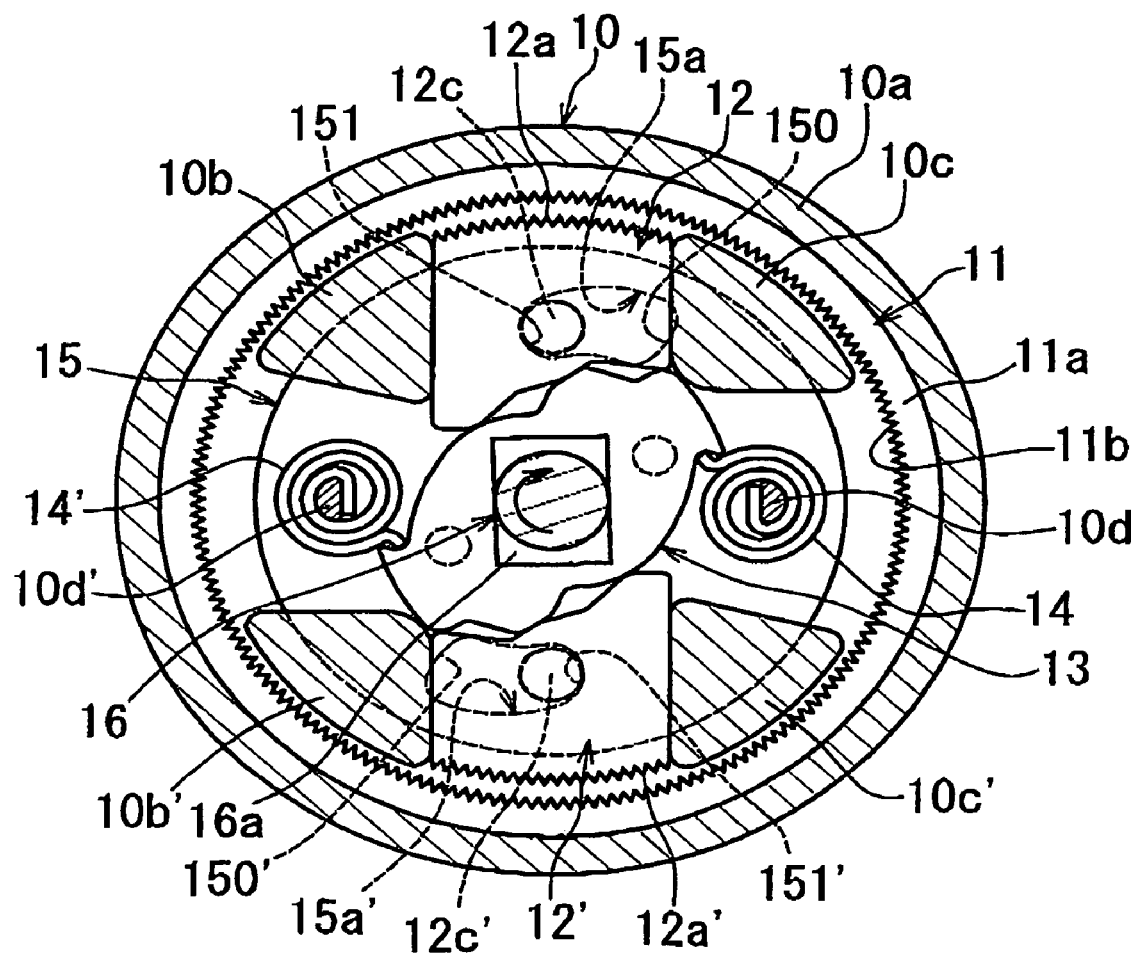
FIG. 11 is a schematic view showing an internal structure of the conventional recliner device of FIG. 8 in an unlocked condition.
Figure 12:
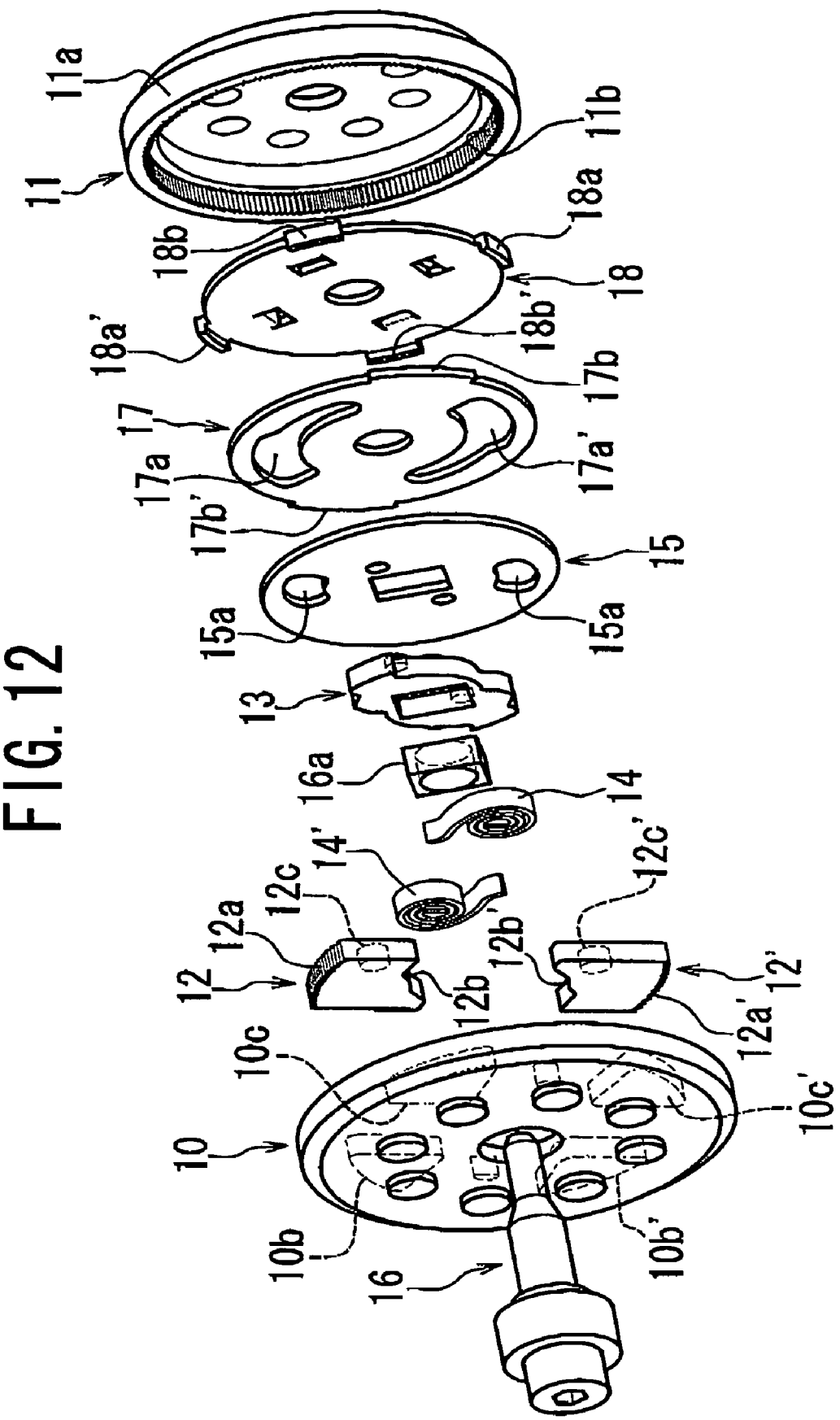
FIG. 12 is a schematic exploded perspective view of the recliner device according to the present invention.

In the same manner as shown in FIGS. 9 and 10, the recliner devices according to the present invention which are constructed as described above are provided at the pivotal points between the side plates 2a of the seat back frame 2 and the bracket plates 3a of the seat cushion frame with the housings being mounted to the bracket plates 3a of the seat cushion and with the covers being mounted to the side plates 2a of the seat back frame 2. When the latches are disengaged from the covers by operating the operating lever and the seat back is pivoted relative to the seat cushion, the covers is rotated relative to the housings.

Figure 17:
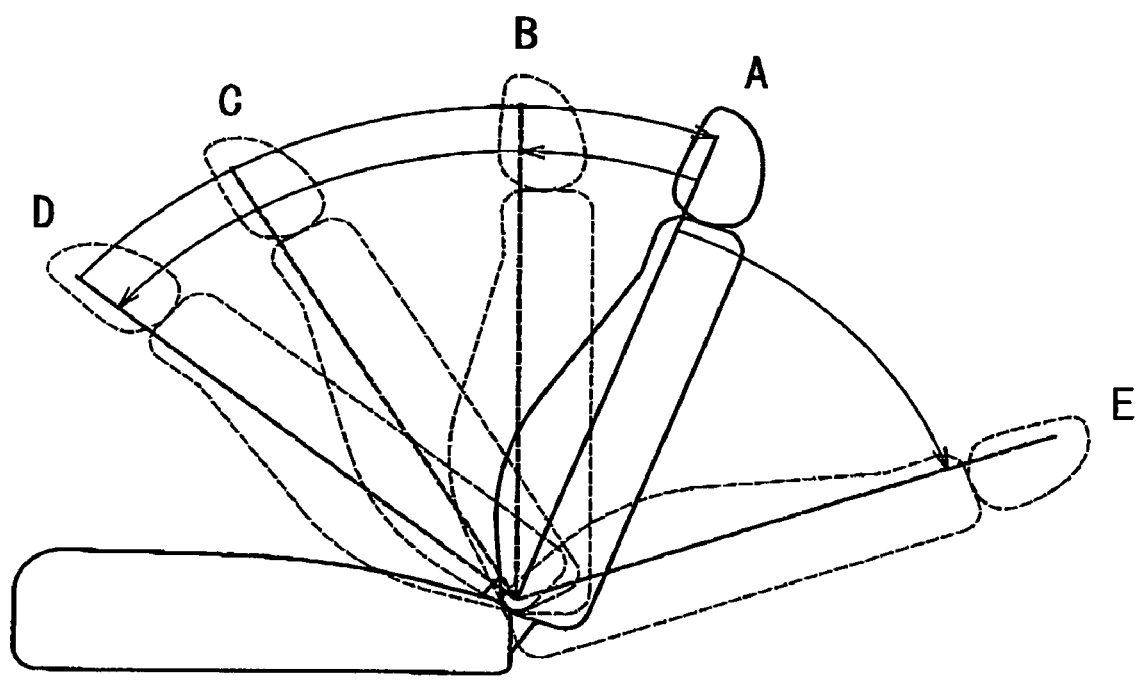
FIG. 17 is a schematic view of a vehicle seat provided with the recliner devices according to the present invention, which is of assistance in explaining forward and rearward pivotal movement of a seat back of the vehicle seat.

In the vehicle seat provided with the recliner devices according to the embodiment of the present invention, as shown in FIG. 17, the predetermined point at which a seat back of the vehicle seat is in a normal standing posture relative to a seat cushion of the vehicle seat is denoted by reference numeral A, a point at which the seat back is in a substantially vertically standing posture relative to the seat cushion is designated by reference numeral B, a point at which the seat back is inclined or folded forward is denoted by reference numeral C, a forward dead point at which the seat back is completely inclined or folded forward is designated by reference numeral D, and a rearward dead point at which the seat back is completely inclined or collapsed rearward is denoted by reference numeral E. The operation of each of the recliner devices will be discussed hereinafter.

Figure 18:
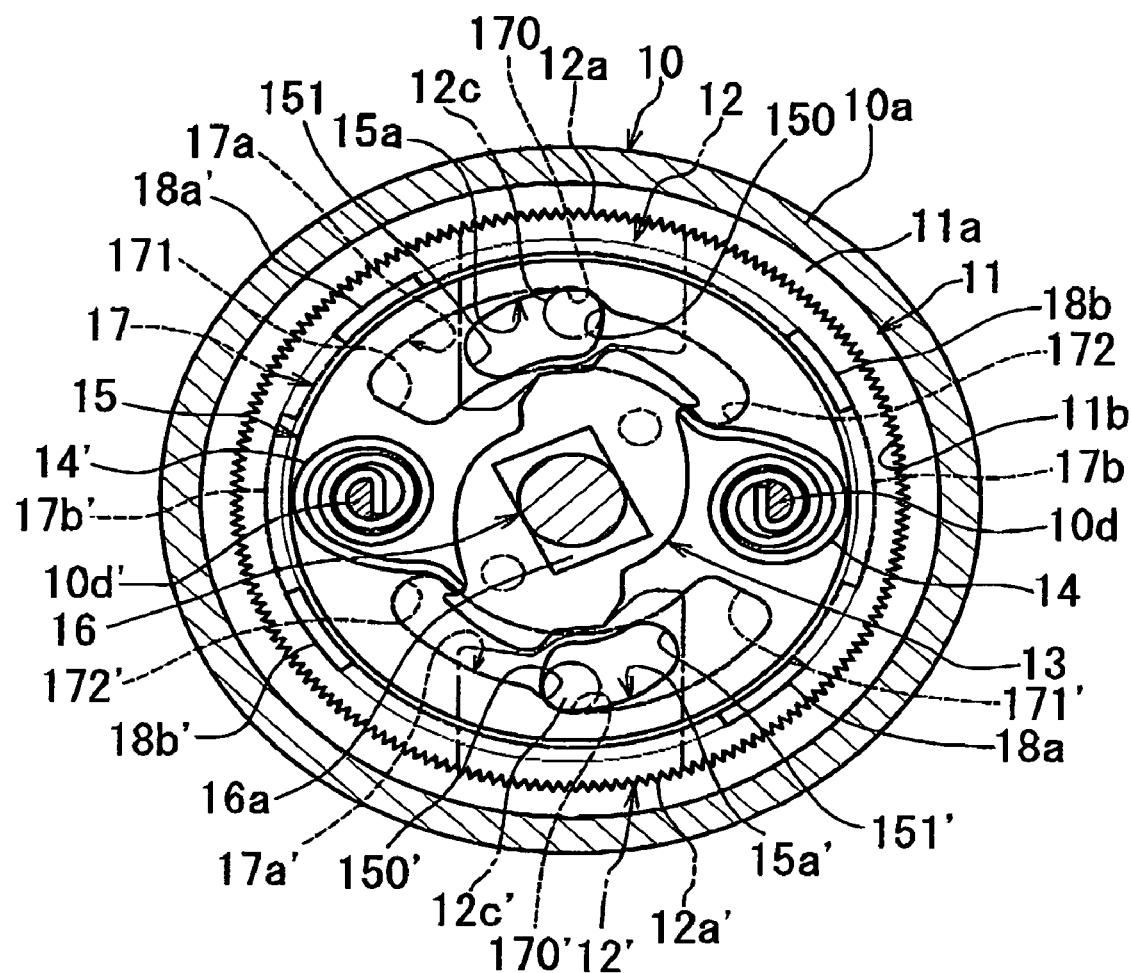
FIG. 18 is a schematic view that is of assistance in explaining an internal structure of the recliner device in a state where the seat back of FIG. 17 is in a standard, vertically standing posture.

Referring to FIG. 18, there is illustrated the recliner device in a state where the seat back is in the normal standing posture or is positioned at the point A. In this condition, the cam 13 urges the latches 12, 12' to the locked positions due to the actions of the spiral springs 14, 14', whereby the gear teeth 12a, 12a' of the latches 12, 12' are meshed or engaged with the gear teeth 11b of the cover 11. Therefore, the seat back to which the cover 11 is welded is kept unrotatable or uninclinable relative to the seat cushion to which the housing 10 is welded. That is, the seat back is kept in a locked condition relative to the seat cushion.

In this condition, the inducting pins 12c, 12c' of the latches 12, 12' are located at the first hole end portions 150, 150' of the guide holes 15a, 15a' relative to the cam disc 15, and located at the middle hole portions 170, 170' of the controlling holes 17a, 17a' relative to the memory disc 17. The feeding pawls 18a, 18a' of the applying plate 18 for rotating the memory disc 17 in the normal rotational direction are spaced apart from the protruding pieces 17b, 17b' relative to the memory disc 17.

Figure 19:
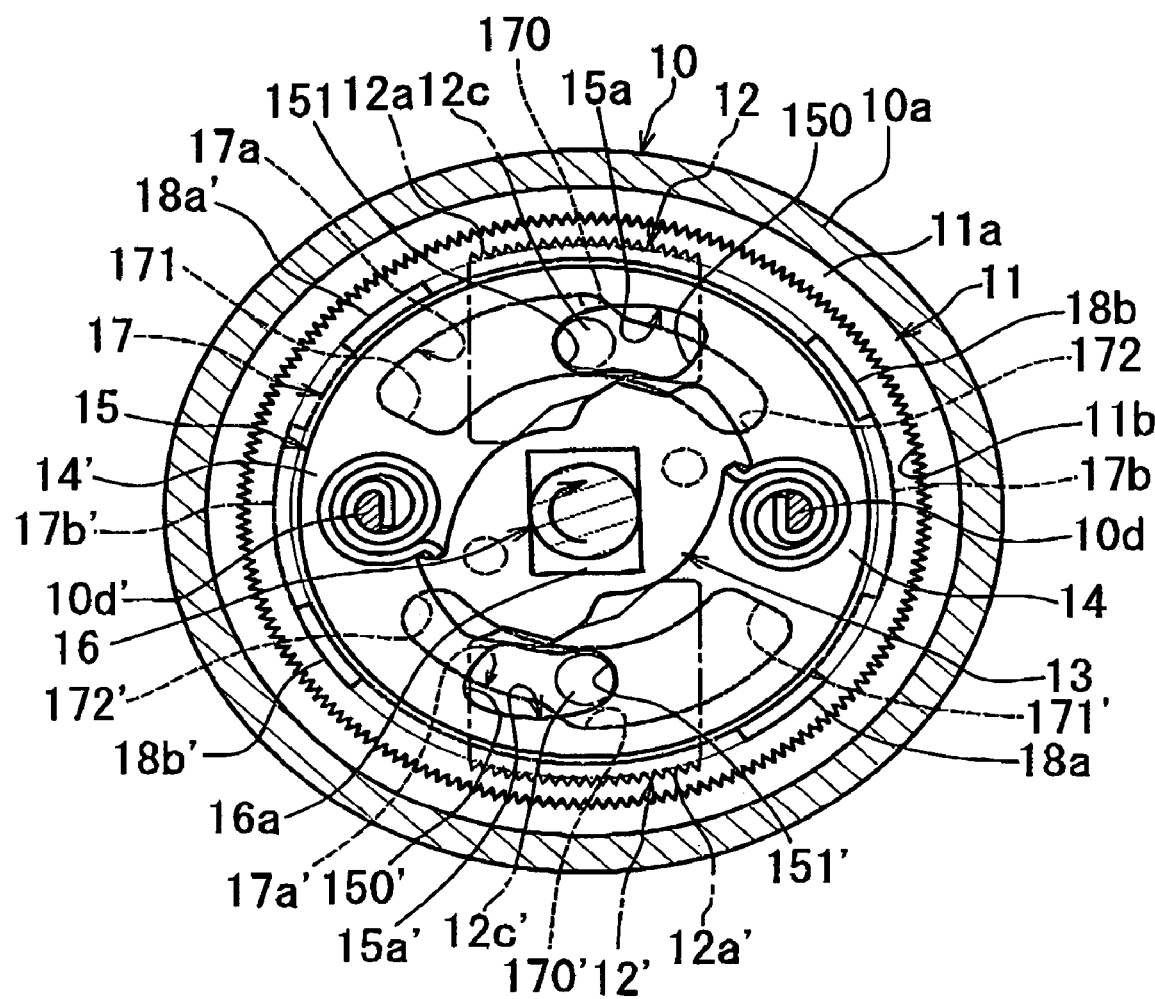
FIG. 19 is a schematic view that is of assistance in explaining the internal structure of the recliner device that is changed into an unlocked condition from the condition of FIG. 18 by operating an operating lever.

When the operating lever is manually rotated by the person in order to cause the seat back to be pivoted from the point A to the point B, the actuating shaft 16 of the recliner device is rotated in a clockwise direction as indicated by an arrow in FIG. 19, and the cam 13 and cam disc 15 which are integrally mounted on the actuating shaft 16 are rotated in the same direction. At this time, the cam 13 is rotated in such a manner to allow the latches 12, 12' to be released from the pushing by the cam 13. Also, by the rotation of the cam 13, the inducting pins 12c, 12c' of the latches 12, 12' are shifted to the second hole portions 151, 151' of the guide holes 15a, 15a' relative to the cam disc 15, whereby the gear teeth 12a, 12a of the latches 12, 12' are disengaged from the gear teeth 11b of the cover 11. Thus, the cover 11 is brought to the unlocked condition relative to the housing 10.

Figure 20:
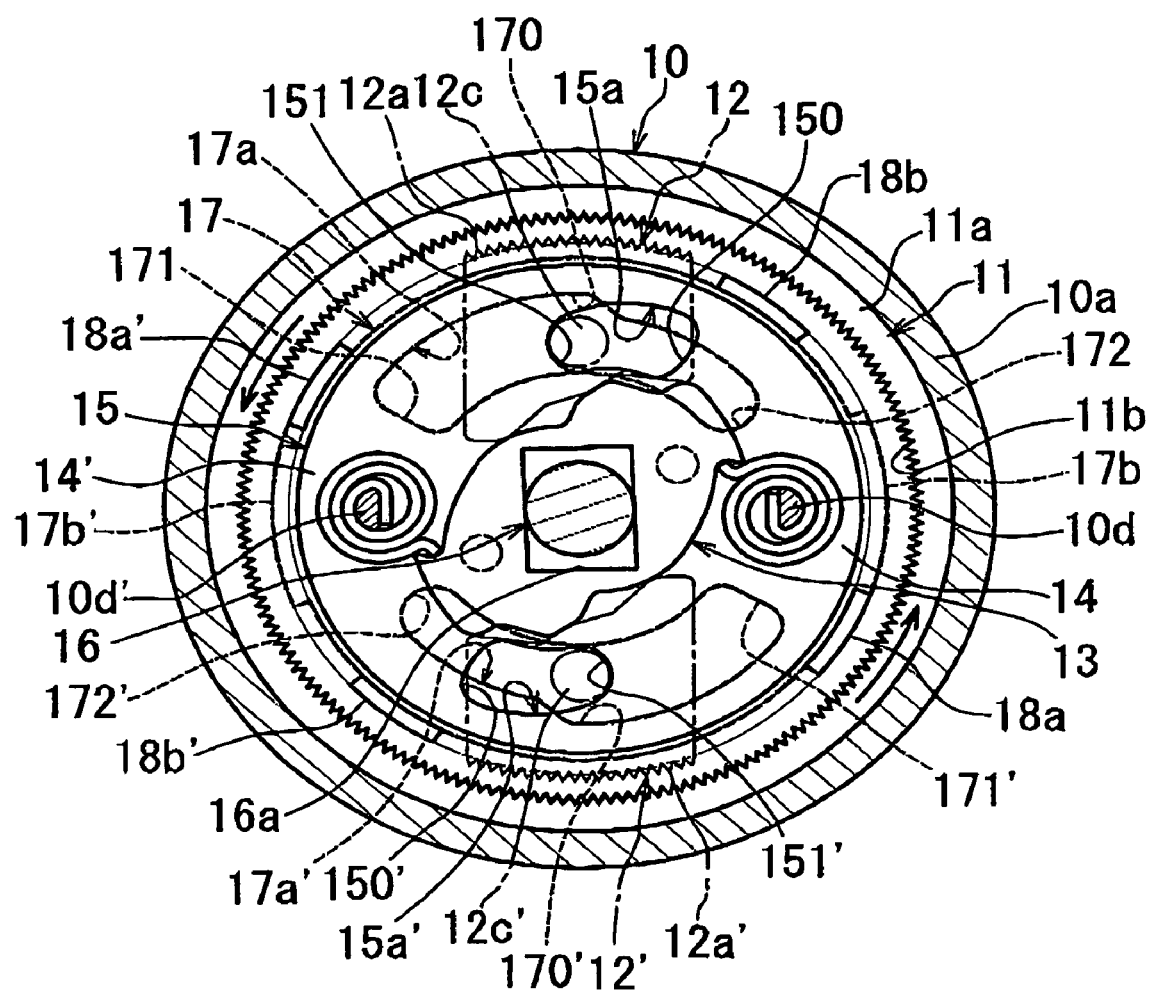
FIG. 20 is a schematic view that is of assistance in explaining the operation of the recliner device that is performed from the condition of FIG. 19 when the seat back is pivoted forward.

When the cover 11 is brought to the unlocked condition as shown in FIG. 20, the cover 11 becomes rotatable relative to the housing 10. Therefore, in this condition, if the person still holds the operating lever, the seat back can be pivoted to the point B from the normal standing position A. As the seat back is moved to the substantially vertically standing position B, the cover 11 is rotated relative to the housing 10, whereby the applying plate 18 secured to the cover 11 is rotated so as to cause the feeding pawls 18a, 18a' of the applying plate 18 to be abutted against the protruding pieces 17b, 17b' of the memory disc 17.

Figure 21:
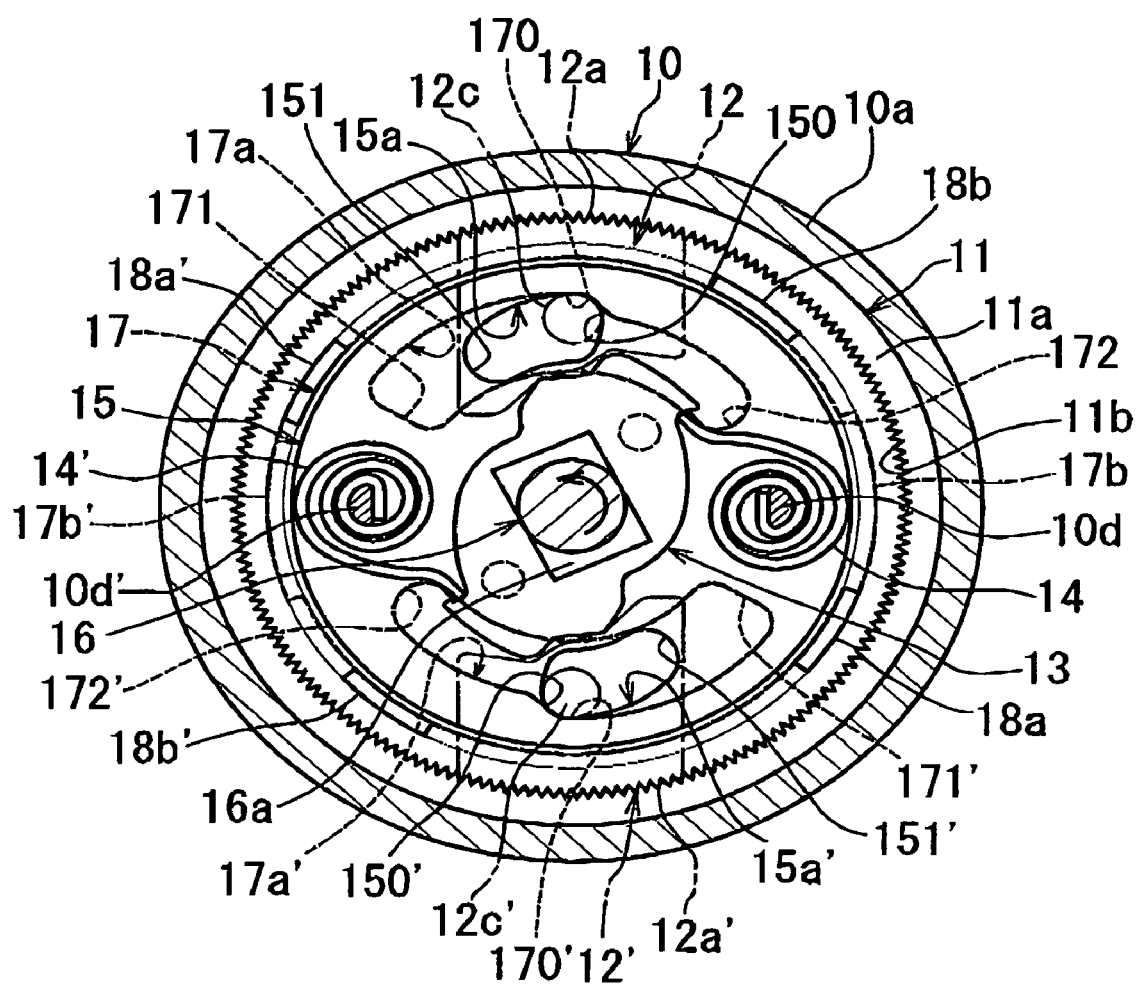
FIG. 21 a schematic view that is of assistance in explaining the operation of the recliner device that is performed from the condition of FIG. 20 when the operating lever is released from a person's hand.

When the operating lever is released from the person in a condition where the seat back is located at the point B, the cam 13 is rotated due to the actions of the spiral springs 14, 14' so as to cause the latches 12, 12' to be urged toward the locked positions, and the cam disc 15, latches 12, 12', and actuating shaft 16 return to their original positions. As a result, the gear teeth 12a, 12a' of the latches 12, 12' are meshed with the gear teeth 11b of the cover 11, whereby the cover is brought to the locked condition relative to the housing 10 as shown in FIG. 21. Thus, the seat back is kept located at the point B. Incidentally, the recliner device according to the present invention can be applied to a vehicle seat in which a seat cushion of the seat is adapted to be tipped up relative to a seat back of the seat which is in a vertically standing posture.

Figure 22:
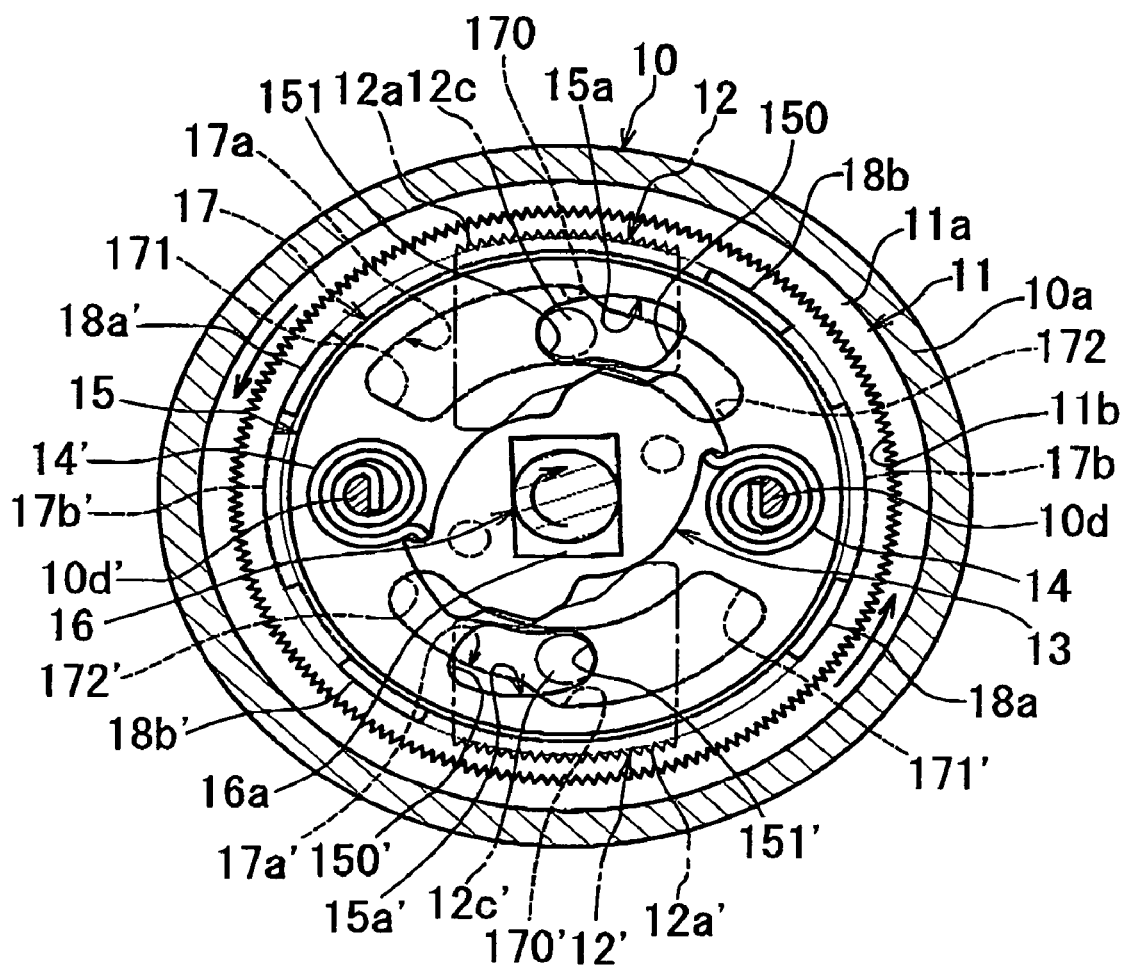
FIG. 22 is a schematic view that is of assistance in explaining the operation of the recliner device that is performed when a locked condition of the recliner device is released in the condition of FIG. 20.

When the person again causes the operating lever to be rotated, in a condition where the seat back is located at the point B, the cover 11 is brought to the unlocked condition as shown in FIG. 22. In this condition, the seat back can be pivoted to the point C from the point B. As the seat back is pivoted toward the point C from the point B, the cover 11 is rotated relative to the housing 10, and the feeding pawls 18a, 18a' of the applying plate 18 secured to the cover 11 push the protruding pieces 17b, 17b' of the memory disc 17, whereby the memory disc 17 is rotated around the actuating shaft 16 relative to the cam disc 15.

Figure 23:
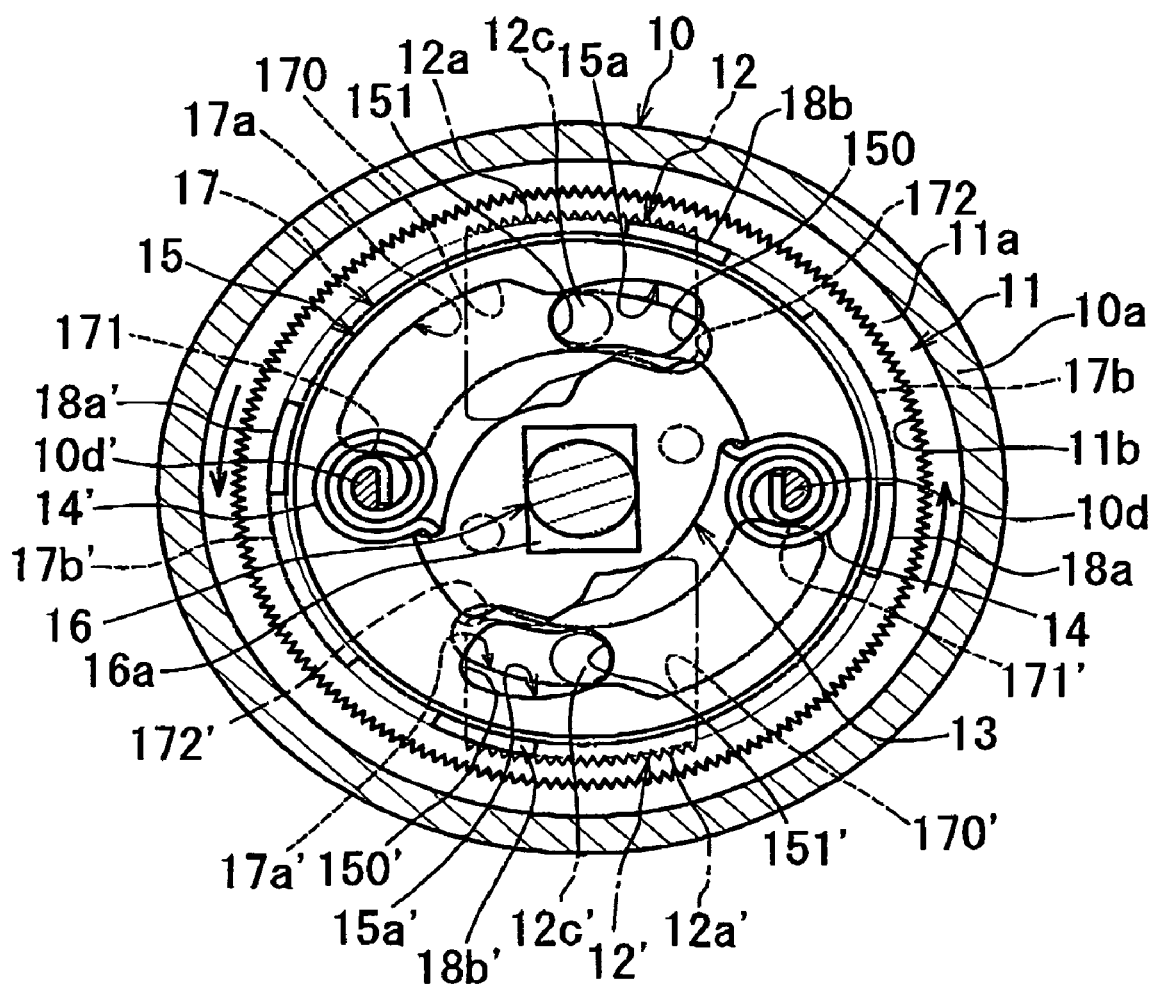
FIG. 23 is a schematic view that is of assistance in explaining the operation of the recliner device that is performed from the condition of FIG. 22 when the seat back is inclined forward.

During the rotation of the memory disc 17 relative to the cam disc 15, the inducting pins 12c, 12c' of the latches 12, 12' which are located at the second hole ends 151, 151' of the guide holes 15a, 15a' relative to the cam disc 15 are shifted toward the second hole portions 172, 172' of the controlling holes 17a, 17a' from the middle portions 170, 170' of the controlling holes 17a, 17a' relative to the memory disc 17 while being still received in the second hole ends 151, 151' relative to the cam disc 15, and are received in the second hole portions 172, 172' which correspond to the unlocked positions of the latches 12, 12'. As a result, the cover 11 is kept in the rotatable condition relative to the housing 10 as shown in FIG. 23. In this condition, even if the operating lever is released from the person's hand, the seat back is allowed to be pivoted from the point C to the point D.

Figure 24:
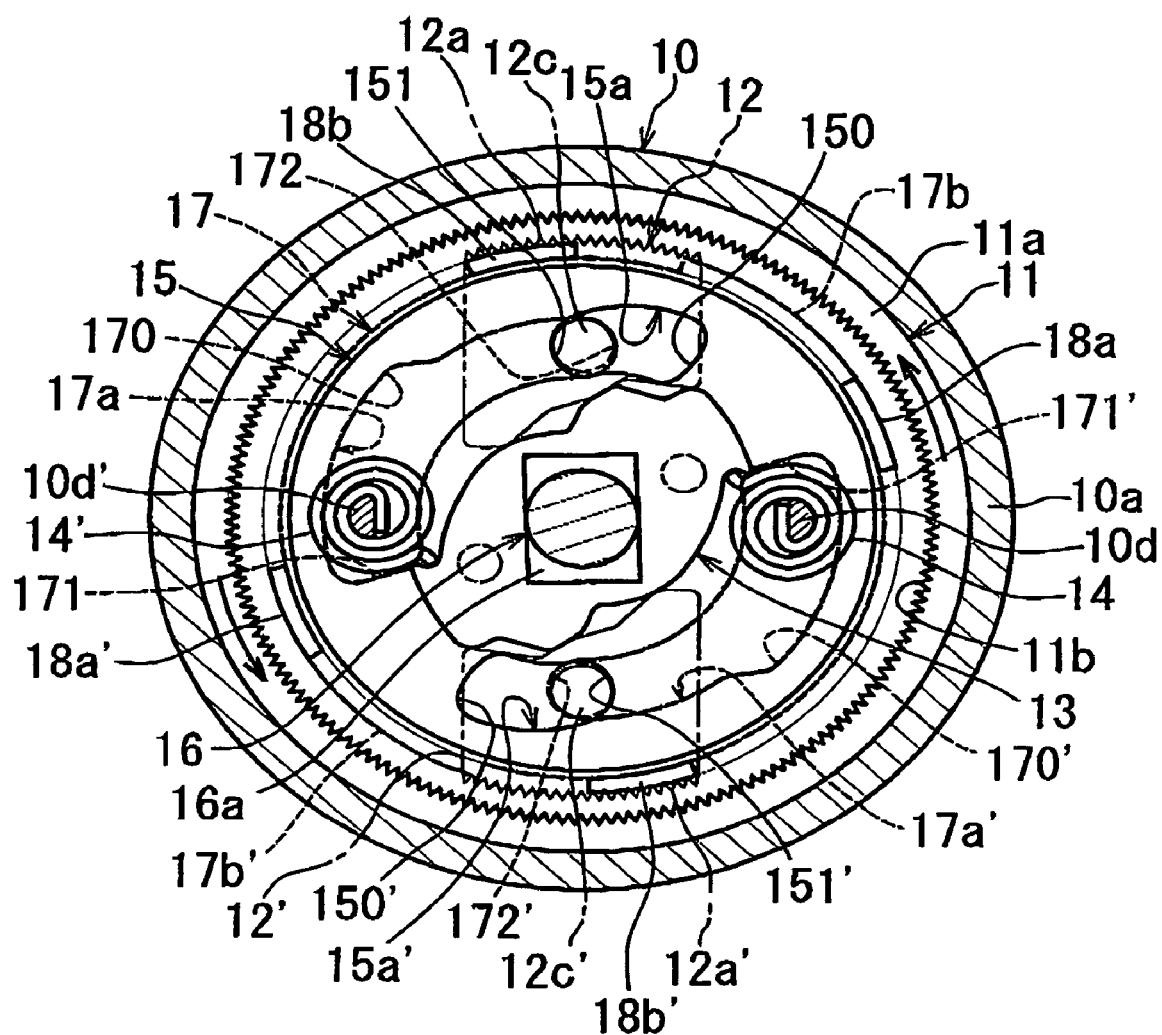
FIG. 24 is a schematic view that is of assistance in explaining the operation of the recliner device that is performed from the condition of FIG. 23 when the seat back is inclined to a forward dead point.

When the seat back is pivoted to the forward dead point D, the inducting pins 12c, 12c' of the latches 12, 12' arrive at ends of the second hole portions 172, 172' of the controlling holes 17a, 17a' while being still received in the second hole end portions 151, 151' of the guide holes 15a, 15a' as shown in FIG. 24, whereby the seat back is kept in a completely forward inclined state by the tension springs stretched between the side plates of the seat back frame and the bracket plates of the seat cushion frame.

In a condition where the seat back is located at the point D, the inducting pins 12c, 12c' of the latches 12, 12' are received in and engaged with the ends of the second hole portions 172, 172' of the controlling holes 17a, 17a', so that the seat back is kept unlocked relative to the seat cushion, and the seat back which is urged by the tension springs so as to be inclined forward is prevented from being further inclined forward from the forward dead point D. Therefore, an additional stopper for restricting further forward inclining movement of the seat back is not required.

Figure 25:
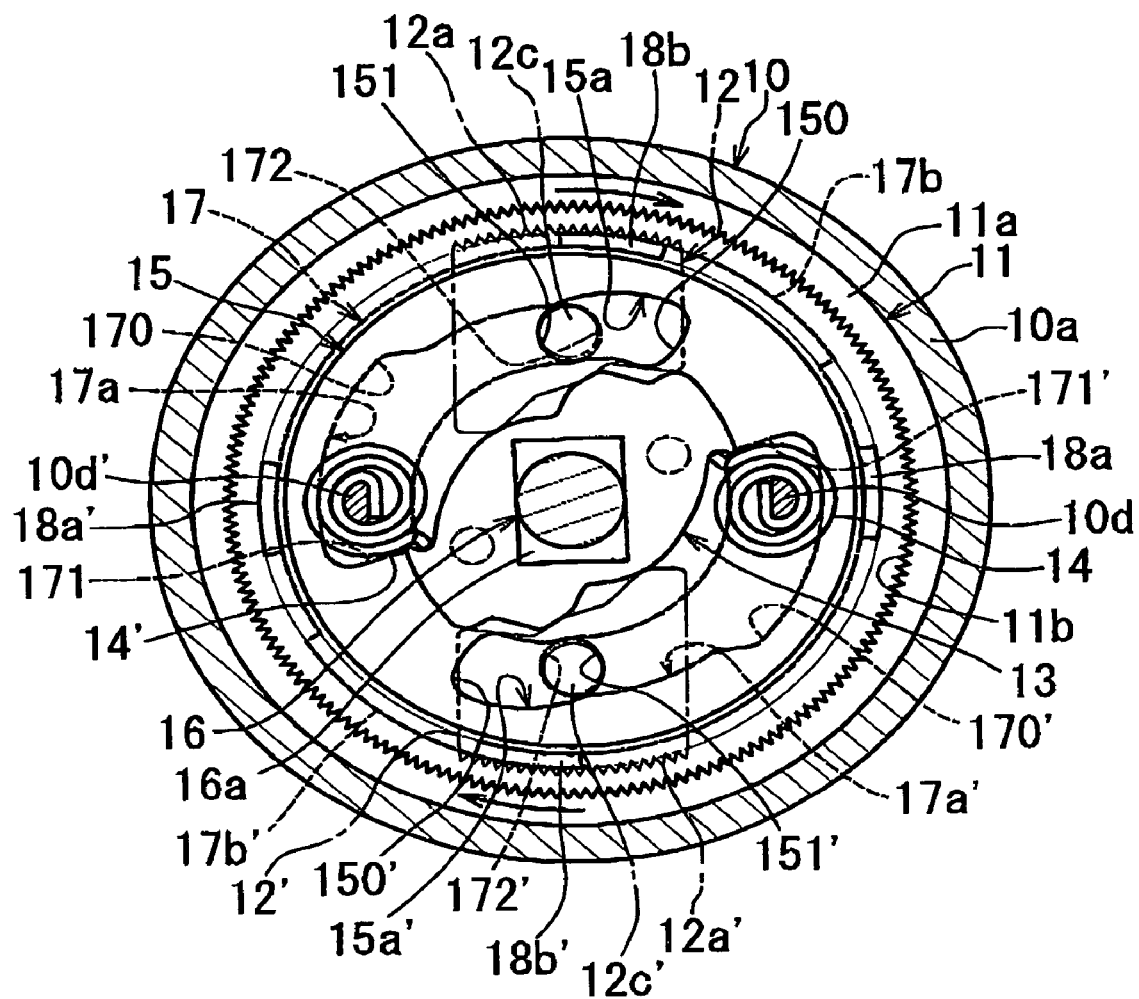
FIG. 25 is a schematic view that is of assistance in explaining the operation of the recliner device that is performed from the condition of FIG. 24 when the seat back is inclined rearward.

The seat back is kept in the unlocked condition as discussed above, so that returning of the seat back to the point A from the point D can be performed only by manually causing the seat back to be raised up without operating the operating lever, as will be discussed hereinafter. During the raising-up of the seat back, the cover 11 and the applying plate 18 are rotated in the clockwise direction. When the seat back is pivoted while causing the cover 11 and the applying plate 18 to be rotated, and arrives at the point B, the feeding pawls 18b, 18b' of the applying plate 18 are abutted against the protruding pieces 17b, 17b' of the memory disc 17 as shown in FIG. 25.

When the seat back arrives at the point B, the feeding pawls 18b, 18b' of the applying plate 18 are abutted against the protruding pieces 17b, 17b' of the memory disc 17 but the memory disc 17 is not yet rotated by the feeding pawls 18b, 18b' of the applying plate 18, so that the inducting pins 12c, 12c' of the latches 12, 12' are still received in the ends of the second hole portions 172, 172' of the controlling holes 17a, 17a' relative to the memory disc 17. Therefore, the seat back is still kept in the unlocked condition relative to the seat cushion at the point B.

Figure 26:
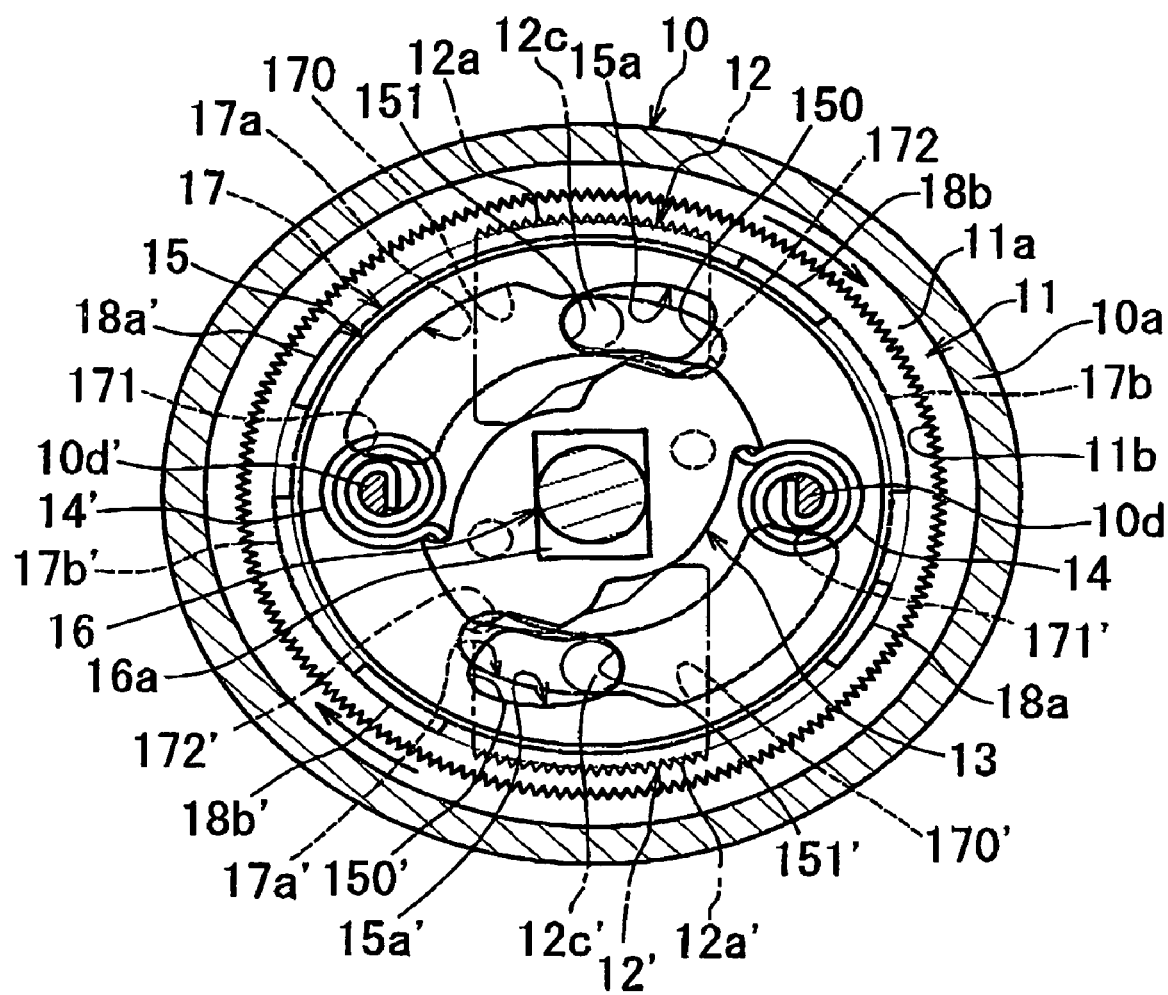
FIG. 26 is a schematic view that is of assistance in explaining the operation of the recliner device that is performed from the condition of FIG. 25 when the seat back is returned to a position prior to a standard, vertically standing position.

When the seat back is pivoted to the point A from the point B, the cover 11 and the applying plate 18 are rotated, whereby the memory disc 17 is rotated in the reverse direction by the feeding pawls 18b, 18b' of the applying plate 18 as shown in FIG. 26. As a result, the inducting pins 12c, 12c' of the latches 12, 12' are received in the middle hole portions 170, 170' of the controlling holes 17a, 17a' of the memory disc 17 relative to the memory disc 17. Also, the cam 13 is rotated due to the actions of the spiral springs 14, 14' so as to push the latches 12, 12' toward the locked positions of the latches 12, 12', whereby the gear teeth 12a, 12a' of the latches 12, 12' are operatively meshed or engaged with the gear teeth 11b of the cover 11. As a result, the cover 11 is brought to the locked condition relative to the housing, whereby the seat back is brought to the locked condition relative to the seat cushion at the predetermined point A.

Figure 27:
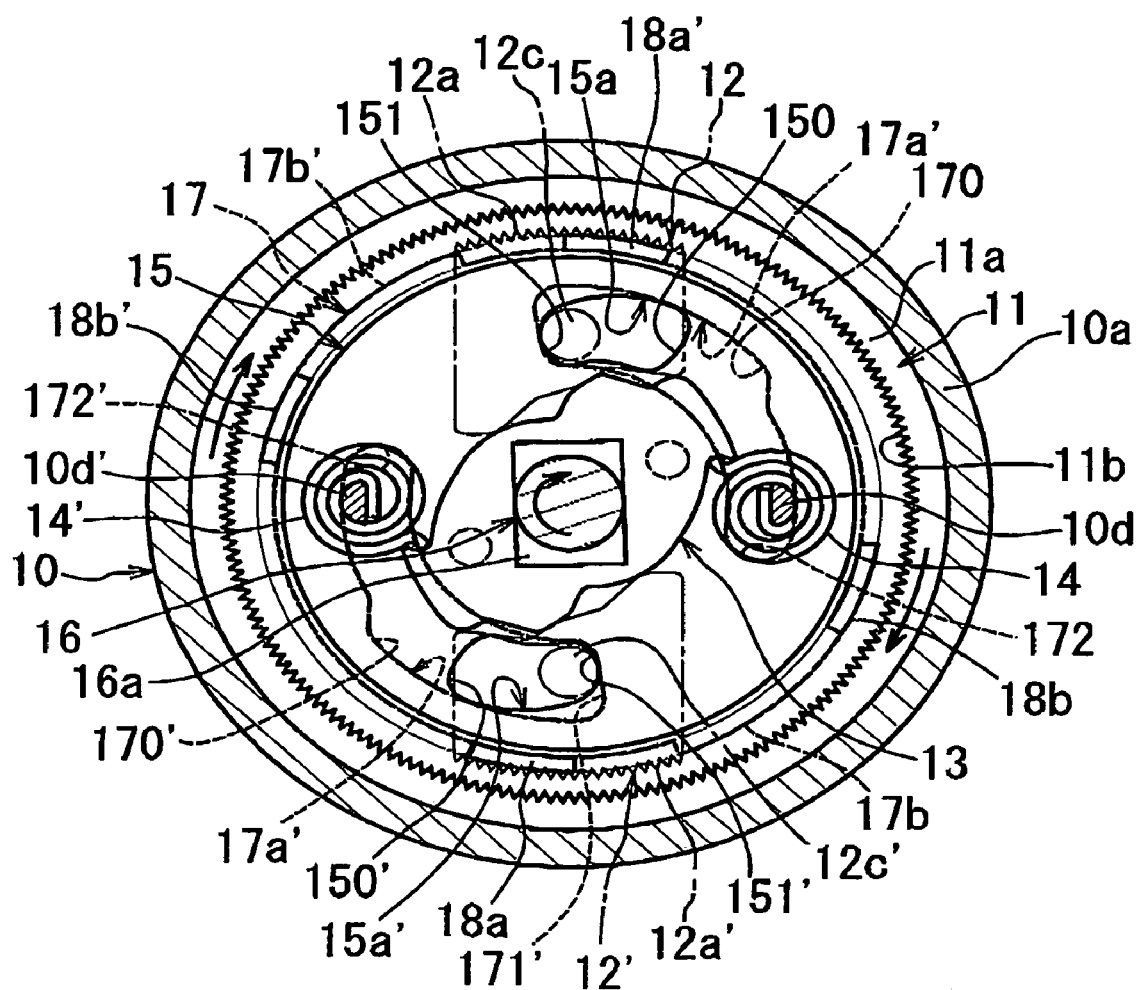
FIG. 27 is a schematic view that is of assistance in explaining the operation of the recliner device that is performed when the seat back is inclined rearward from the standard, vertically standing posture of the seat back of FIG. 17.

When the operating lever is operated in order to cause the seat back to be pivoted to the point E or rearward, the gear teeth 12a, 12a' of the latches 12, 12' are disengaged from the gear teeth 11b of the cover 11 as shown in FIG. 27, whereby the cover 11 is brought to the rotatable condition relative to the housing 10. In this condition, when the seat back is manually pivoted rearward, the applying plate 18 is rotated and the feeding pawls 18b, 18b' of the applying plate 18 are abutted against the protruding pieces 17b, 17b' of the memory disc 17, whereby the memory disc 17 is rotated in a counterclockwise direction and the first hole portions 171, 171' of the controlling holes 17a, 17a' receive the inducting pins 12c, 12c' of the latches 12, 12'.

Figure 28:
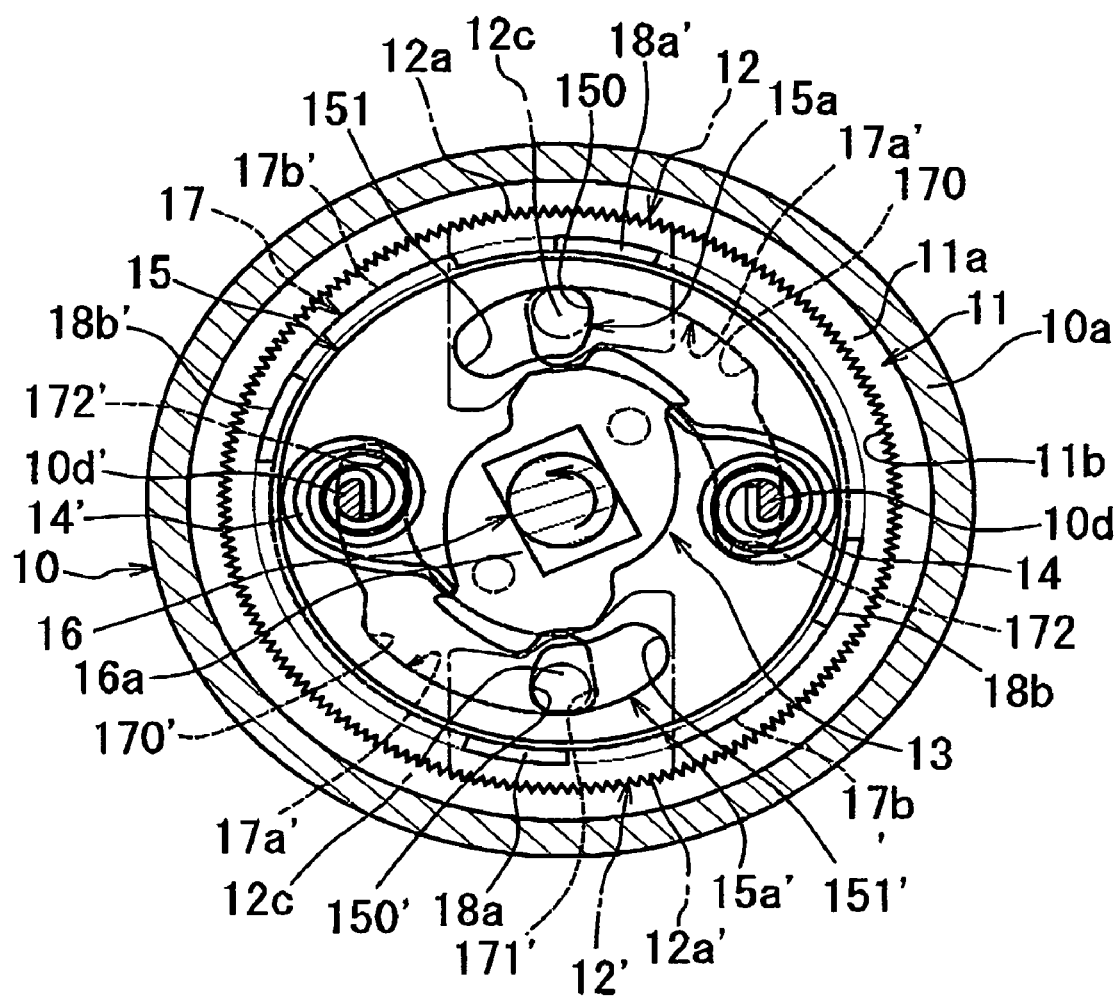
FIG. 28 is a schematic view that is of assistance in explaining the operation of the recliner device that is performed when the seat back is pivoted to a rearward dead point.

In a condition where the first hole portions 171, 171' of the controlling holes 17a, 17a' receive the inducting pins 12c, 12c' of the latches 12, 12', when the operating lever is released from the person's hand, the cam 13 is rotated due to the actions of the spiral springs 14, 14' so as to push the latches 12, 12' toward the locked positions, whereby the gear teeth 12a, 12a' of the latches 12, 12' are meshed with the gear teeth 11b of the cover 11 as shown in FIG. 28. Thus, the seat back can be brought to a locked condition within a range between the point A and the point E.

In summary, when the seat back is to be inclined forward from the point A to the point B and is to be pivoted from the point A to the point E, the seat back is brought to unlockable and lockable conditions by operating the operating lever and releasing of the operating lever from the person's hand. On the other hand, when the seat back is to be pivoted from the point B to the point D and from the point D to the point A, the seat back is brought to the unlocked condition relative to the seat cushion, even if the operating lever is not operated. Particularly, rising movement of the seat back from the point D to the point A or the predetermined point can be performed without operating the operating lever.

While the predetermined point is set so as to correspond to the normal standing position of the seat back in the above-mentioned embodiment, the predetermined point may be set according to the use of the vehicle seat if necessary.

As discussed above, in the vehicle seat with the recliner means according to the present invention, the latches are arranged with the housing so as to be movable between the locked positions and unlocked positions, the housing is mounted on the axial portion of the actuating shaft so as to cause the latches to be engaged with the cam, the inducting pins are inserted through the guide holes of the cam disc, the cover is rotatably combined with the housing, and the latches are urged toward the locked positions by the cam due to the actions of the springs, whereby the gear teeth of the latches are engaged with the gear teeth of the cover. The recliner means further includes the memory disc that is mounted on the axial portion of the actuating shaft so as to face the cam disc. The memory disc is formed with the controlling holes extending longer than the guide holes of the cam disc. The controlling holes include the first hole portions extending beyond the first hole end portions of the guide holes, the second hole portions extending beyond the second hole end portions of the guide holes, and the middle hole portions. The first hole portions of the controlling holes positionally correspond to the locked positions. The second hole portions of the controlling holes positionally correspond to the unlocked positions. The inducting pins of the latches are inserted in the middle hole portions of the controlling holes from the first hole end portions of the guide holes. The memory disc has the spaced apart protruding pieces protruding radially from a periphery thereof. The feeding pawls of the cover are interposed between the protruding pieces of the memory disc so as to be capable of being selectively abutted against the protruding pieces of the memory disc. The memory disc is adapted to be rotated in one direction or the other direction by abutting of the feeding pawls against the protruding pieces in synchronization with the rotation of the cover relative to the housing. Thus, returning of the seat back to the predetermined point from a condition where the inducting pins of the latches are received in the second hole portions of the controlling holes, that is, a condition where the seat back is inclined forwardly relative to the seat cushion, can be simply carried out in a condition where the cover is rotatable relative to the housing. The forward rearward pivotal dead points of the seat back can be positively limited by the controlling holes of the memory disc.

The terms and expressions which have been employed herein are used as terms of descriptions, not of limitation. There is no intention in the use of such terms and expressions of excluding any equivalents of the components, features shown and described or portions thereof. However, it is recognized that various modifications are possible within the scope of the invention claimed.

What is claimed is:

1. Recliner means for allowing a seat back of a vehicle seat to be pivoted or inclined relative to a seat cushion, comprising a disc-like housing having a first bearing hole;
   a disc-like cover having a plate portion, a second bearing hole formed in a central portion of said plate portion, a peripheral wall provided around said plate portion, first gear teeth around an inner surface of said peripheral wall, and spaced apart feeding pawls rising up from said plate portion;
   latches having second gear teeth and inducting pins projecting therefrom;
   said latches being arranged within said housing so as to be movable between locked positions and unlocked positions;
   an actuating shaft;
   a cam having an outer shape suitable for releasably pushing said latches;
   a cam disc having guide holes formed therein, said guide holes including first hole end portions that are adjacent a periphery of said cam disc, and second hole end portions that are adjacent a center of said cam disc;
   said first hole end portions positionally corresponding to said locked positions;
   said second hole end portions positionally corresponding to said unlocked positions;
   said cam and said cam disc being integrally mounted on an axial portion of said actuating shaft;
   said housing mounted on said axial portion of said actuating shaft through said first bearing hole so as to cause said latches to be engaged with said cam;

said inducting pins of said latches being inserted through said first hole end portions of said guide holes of said cam disc;
springs for biasing said cam;
said springs being provided between said cam and said housing to urge said cam so as to urge said latches toward said locked positions through said cam;
said cover being mounted on said axial portion of said actuating shaft through said second bearing hole in a face-to-face relation with said housing so as to be rotatable relative to said housing;
said housing and said cover being adapted to be locked relative to each other by engagement of said first gear teeth of said latches with said second gear teeth of said cover at said locked positions;
a memory disc mounted on said axial portion of said actuating shaft so as to face said cam disc; and
said memory disc being formed with controlling holes extending longer than said guide holes of said cam disc;
said controlling holes including first hole portions extending beyond said first hole end portions of said guide holes, second hole portions extending beyond said second hole end portions of said guide holes, and middle hole portions;
said first hole portions of said controlling holes positionally corresponding to said locked positions;
said second hole portions of said controlling holes positionally corresponding to said unlocked positions;
said inducting pins of said latches being inserted in said middle hole portions of said controlling holes from said first hole end portions of said guide holes;
said memory disc having spaced apart protruding pieces protruding radially from a periphery thereof;
said feeding pawls of said cover being interposed between said protruding pieces of said memory disc so as to be capable of being selectively abutted against said protruding pieces of said memory disc; and
said memory disc being adapted to be rotated in one direction or the other direction by abutting of said feeding pawls against said protruding pieces in synchronization with the rotation of said cover relative to said housing;
wherein when said actuating shaft is rotated in a direction, said cam disc integrally mounted on said axial portion of said actuating shaft is rotated so as to cause said latches to be displaced toward said unlocked positions from said locked positions while receiving said inducting pins of said latches at said second hole end portions of said guide holes, to thereby bring to a condition where said cover is rotatable relative to said housing, and when said actuating shaft is released, said latches are urged toward said locked positions by said cam due to actions of said springs, whereby said second gear teeth of said latches are meshed with said first gear teeth of said cover and said cover is locked with respect to said housing.

2. A vehicle seat comprising a seat back, seat cushion, and recliner means for allowing said seat back to be pivoted or inclined relative to said seat cushion, said recliner means comprising:
a disc-like housing having a first bearing hole;
a disc-like cover having a plate portion, a second bearing hole formed in a central portion of said plate portion, a peripheral wall provided around said plate portion, first gear teeth around an inner surface of said peripheral wall, and spaced apart feeding pawls rising up from said plate portion;
latches having second gear teeth and inducting pins projecting therefrom;
said latches being arranged within said housing so as to be movable between locked positions and unlocked positions;
an actuating shaft;
a cam having an outer shape suitable for releasably pushing said latches;
a cam disc having guide holes formed therein, said guide holes including first hole end portions that are adjacent a periphery of said cam disc, and second hole end portions that are adjacent a center of said cam disc;
said first hole end portions positionally corresponding to said locked positions;
said second hole end portions positionally corresponding to said unlocked positions;
said cam and said cam disc being integrally mounted on an axial portion of said actuating shaft;
said housing mounted on said axial portion of said actuating shaft through said first bearing hole so as to cause said latches to be engaged with said cam;
said inducting pins of said latches being inserted through said first hole end portions of said guide holes of said cam disc;
springs for biasing said cam;
said springs being provided between said cam and said housing to urge said cam so as to urge said latches toward said locked positions through said cam;
said cover being mounted on said axial portion of said actuating shaft through said second bearing hole in a face-to-face relation with said housing so as to be rotatable relative to said housing;
said housing and said cover being adapted to be locked relative to each other by engagement of said first gear teeth of said latches with said second gear teeth of said cover at said locked positions;
a memory disc mounted on said axial portion of said actuating shaft so as to face said cam disc; and
said memory disc being formed with controlling holes extending longer than said guide holes of said cam disc;
said controlling holes including first hole portions extending beyond said first hole end portions of said guide holes, second hole portions extending beyond said second hole end portions of said guide holes, and middle hole portions;
said first hole portions of said controlling holes positionally corresponding to said locked positions;
said second hole portions of said controlling holes positionally corresponding to said unlocked positions;
said inducting pins of said latches being inserted in said middle hole portions of said controlling holes from said first hole end portions of said guide holes;
said memory disc having spaced apart protruding pieces protruding radially from a periphery thereof;
said feeding pawls of said cover being interposed between said protruding pieces of said memory disc so as to be capable of being selectively abutted against said protruding pieces of said memory disc; and
said memory disc being adapted to be rotated in one direction or the other direction by abutting of said feeding pawls against said protruding pieces in synchronization with the rotation of said cover relative to said housing;
wherein when said actuating shaft is rotated in a direction, said cam disc integrally mounted on said axial portion of said actuating shaft is rotated so as to cause said latches to be displaced toward said unlocked positions from said locked positions while receiving said inducting pins of said latches at said second hole end portions of said guide holes, to thereby bring to a condition where said cover is rotatable relative to said housing, and when said actuating shaft is released, said latches are urged toward said locked positions by said cam due to actions of said springs, whereby said second gear teeth of said latches are meshed with said first gear teeth of said cover and said cover is locked with respect to said housing.

* * * * *